US008371117B2

(12) United States Patent
Nakamura et al.

(10) Patent No.: US 8,371,117 B2
(45) Date of Patent: Feb. 12, 2013

(54) TORQUE CONTROL APPARATUS FOR CONSTRUCTION MACHINE THREE-PUMP SYSTEM

(75) Inventors: Kazunori Nakamura, Tsuchiura (JP); Kouji Ishikawa, Kasumigaura (JP); Nobuei Ariga, Tsuchiura (JP); Akihiro Narazaki, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1033 days.

(21) Appl. No.: 12/159,265

(22) PCT Filed: Sep. 7, 2007

(86) PCT No.: PCT/JP2007/067534

§ 371 (c)(1),
(2), (4) Date: Jun. 26, 2008

(87) PCT Pub. No.: WO2008/068938

PCT Pub. Date: Jun. 12, 2008

(65) Prior Publication Data

US 2010/0218493 A1 Sep. 2, 2010

(30) Foreign Application Priority Data

Dec. 7, 2006 (JP) ................................ 2006-330646

(51) Int. Cl.
*F16D 31/02* (2006.01)

(52) U.S. Cl. ........................................... 60/449; 60/452

(58) Field of Classification Search .................... 60/449, 60/452

See application file for complete search history.

(56) References Cited

U.S. PATENT DOCUMENTS

| | | | | |
|---|---|---|---|---|
| 4,606,313 | A | 8/1986 | Izumi et al. | |
| 4,967,557 | A * | 11/1990 | Izumi et al. | 60/449 |
| 6,823,672 | B2 * | 11/2004 | Nakamura | 60/449 |
| 2004/0020082 | A1 * | 2/2004 | Ariga et al. | 37/236 |

FOREIGN PATENT DOCUMENTS

| | | |
|---|---|---|
| EP | 1 286 057 | 2/2003 |
| JP | 10-159807 | 6/1998 |
| JP | 2001-323904 | 11/2001 |
| JP | 2002-242904 | 8/2002 |
| JP | 2003-113809 | 4/2003 |
| JP | 2004-108155 | 4/2004 |

* cited by examiner

*Primary Examiner* — F. Daniel Lopez
(74) *Attorney, Agent, or Firm* — Mattingly & Malur, PC

(57) ABSTRACT

Torque control for a construction machine three-pump system that can accurately control the total absorption torque of first, second, and third hydraulic pumps and effectively use the output torque of an engine. A pump base torque computation section 42 calculates a pump base torque Tr from a target rotation speed. A subtraction section 44 calculates a reference value Tf for the maximum absorption torque available to the first and second hydraulic pumps 2, 3 by subtracting a third pump reference absorption torque T3r from the pump base torque Tr. A correction torque computation section 45 calculates a correction torque value from the delivery pressure of the third hydraulic pump 4. An addition section 46 calculates a target absorption torque Tn by adding the correction torque value Tm to the reference value Tf. A first regulator 31 is controlled so as to obtain the target absorption torque Tn.

19 Claims, 11 Drawing Sheets

TORQUE CONTROL APPARATUS FOR CONSTRUCTION MACHINE THREE-PUMP SYSTEM

TECHNICAL FIELD

The present invention relates to a torque control apparatus for a construction machine three-pump system, and more particularly to a torque control apparatus that is used in a three-pump system for a hydraulic excavator or other construction machine having at least three variable displacement hydraulic pumps driven by a prime mover (engine) in order to exercise control to ensure that the absorption torque of the three hydraulic pumps does not exceed the output torque of the engine.

BACKGROUND ART

There is a three-pump system that is used as a hydraulic drive unit for a hydraulic excavator or other construction machine. The three-pump system includes three hydraulic pumps that are driven by an engine, and drives a plurality of hydraulic actuators through the use of hydraulic fluid discharged from the three hydraulic pumps. An example of the three-pump system is described in Patent Document 1. The three-pump system described in Patent Document 1 includes a first regulator and a second regulator. The first regulator controls the absorption torques of a first hydraulic pump and a second hydraulic pump by controlling the displacements of the first and second hydraulic pumps in accordance with the delivery pressures of the first and second hydraulic pumps. The second regulator controls the absorption torque of a third hydraulic pump by controlling the displacement of the third hydraulic pump in accordance with the delivery pressure of the third hydraulic pump. For the second regulator, spring means is employed to set a maximum absorption torque that is available to the third hydraulic pump. As regards the first regulator, a reference value for a maximum absorption torque available to the first and second hydraulic pumps, which is set by the spring means, is adjusted in accordance with the delivery pressure of the third hydraulic pump, which is introduced through a pressure reducing valve, to control the total absorption torque of the first, second, and third hydraulic pumps. The minimum delivery pressure within the delivery pressure range of the third hydraulic pump over which absorption torque control (or input torque limiting control) is exercised by the second regulator (the maximum delivery pressure within the delivery pressure range of the third hydraulic pump over which absorption torque control is not exercised by the second regulator) is set as a predefined pressure value for the pressure reducing value.

Patent Document 1: Japanese Patent JP-A-2002-242904

DISCLOSURE OF INVENTION

Problem to be Solved by the Invention

As described above, the conventional three-pump system controls the total absorption torque of the first, second, and third hydraulic pumps by feeding back the delivery pressure of the third hydraulic pump to the first regulator. In a state where the delivery pressure of the third hydraulic pump is not higher than a predetermined pressure and absorption torque control (input torque limiting control) is not exercised over the third hydraulic pump, the conventional three-pump system directs the delivery pressure of the third hydraulic pump to the first regulator without changing it, and makes adjustments to increase the maximum absorption torque available to the first and second hydraulic pumps through the use of the delivery pressure of the third hydraulic pump. This ensures that the absorption torque portion not used in the third hydraulic pump is available to the first and second hydraulic pumps. As a result, the output torque of the engine can be effectively used.

Meanwhile, when the delivery pressure of the third hydraulic pump exceeds a predefined pressure value so that absorption torque control is exercised over the third hydraulic pump, the delivery pressure of the third hydraulic pump is reduced to a predefined pressure value by the pressure reducing valve and directed to the first regulator to limit an increase in the maximum absorption torque available to the first and second hydraulic pumps. This makes it possible to avoid an engine stall by exercising control to ensure that the total absorption torque of the first, second, and third hydraulic pumps does not exceed the output torque of the engine.

However, the conventional three-pump system cannot effectively use the output torque of the engine because it cannot accurately determine the absorption torque while absorption torque control is exercised over the third hydraulic pump.

In other words, when the conventional three-pump system controls the maximum absorption torque available to the first and second hydraulic pumps by allowing the pressure reducing valve to reduce the delivery pressure of the third hydraulic pump to a predefined pressure and directing the reduced delivery pressure to the first regulator, it means that the value obtained by subtracting a certain absorption torque corresponding to the predefined pressure (fixed) from the maximum absorption torque allocated to the first to third hydraulic pumps is allocated to the first and second hydraulic pumps. Strictly speaking, however, the maximum absorption torque available to the third hydraulic pump is not fixed because it is set by the spring means. More specifically, the maximum absorption torque set by the spring means is indicated by a straight line or a combination of straight lines in a Pq diagram that shows the relationship between pump delivery pressure and pump displacement, whereas a constant torque curve is indicated by a hyperbolic curve in the Pq diagram. Therefore, the maximum absorption torque does not agree with the constant torque curve. In other words, the delivery pressure of the third hydraulic pump is not adequate for accurate determination of the absorption torque prevailing while absorption torque control is exercised over the third hydraulic pump. This makes it practically impossible to accurately control the total absorption torque of the first, second, and third hydraulic pumps and effectively use the output torque of the engine.

It is an object of the present invention to provide a torque control apparatus for a construction machine three-pump system that can accurately control the total absorption torque of the first, second, and third hydraulic pumps and effectively use the output torque of the engine.

Means for Solving the Problem (1) In accomplishing the above object, according to one aspect of the present invention, there is provided a torque control apparatus for a construction machine three-pump system having a prime mover; a first variable displacement hydraulic pump and a second variable displacement hydraulic pump that are driven by the prime mover; a third variable displacement hydraulic pump that is driven by the prime mover; instruction means for prescribing a target rotation speed of the prime mover; a prime mover control device for controlling the rotation speed of the prime mover in accordance with the target rotation speed prescribed by the instruction means; a first regulator which controls the absorption torques of the first and second hydraulic pumps by controlling the displacements of the first and second hydraulic pumps in accordance with the delivery pressures of the first and second hydraulic pumps; and a second regulator which controls the absorption torque of the third hydraulic pump by controlling the displacement of the third hydraulic pump in accordance with the delivery pressure of the third hydraulic pump, the second regulator including spring means for setting the maximum absorption torque available to the third hydraulic pump, the torque control apparatus comprising: a pressure sensor for detecting the delivery pressure of the third hydraulic pump; and control means for computing the maximum absorption torque available to the first and second hydraulic pumps in accordance with the target rotation speed prescribed by the instruction means and the delivery pressure of the third hydraulic pump that is detected by the pressure sensor, and outputting a control signal according to the computation result; wherein the first regulator controls the displacements of the first and second hydraulic pumps in accordance with the control signal to ensure that the absorption torques of the first and second hydraulic pumps do not exceed the maximum absorption torque computed by the control means.

As described above, the control means computes the maximum absorption torque available to the first and second hydraulic pumps in accordance with the target rotation speed prescribed by the instruction means and the delivery pressure of the third hydraulic pump that is detected by the pressure sensor, and controls the displacements of the first and second hydraulic pumps in accordance with the control signal representing the computation result. This makes it possible to exercise three-pump torque control in accordance with the accurately determined absorption torque of the third hydraulic pump, accurately control the total absorption torque of the first, second, and third hydraulic pumps, and effectively use the output torque of the engine.

(2) In accomplishing the above object, according to another aspect of the present invention, there is provided a torque control apparatus for a construction machine three-pump system having a prime mover; a first variable displacement hydraulic pump and a second variable displacement hydraulic pump that are driven by the prime mover; a third variable displacement hydraulic pump that is driven by the prime mover; instruction means for prescribing a target rotation speed of the prime mover; a prime mover control device for controlling the rotation speed of the prime mover in accordance with the target rotation speed prescribed by the instruction means; a first regulator which controls the absorption torques of the first and second hydraulic pumps by controlling the displacements of the first and second hydraulic pumps in accordance with the delivery pressures of the first and second hydraulic pumps; and a second regulator which controls the absorption torque of the third hydraulic pump by controlling the displacement of the third hydraulic pump in accordance with the delivery pressure of the third hydraulic pump, the second regulator including spring means for setting the maximum absorption torque available to the third hydraulic pump, the torque control apparatus comprising: a pressure sensor for detecting the delivery pressure of the third hydraulic pump; a rotation speed sensor for detecting the actual rotation speed of the prime mover; and control means for computing the deviation between the target rotation speed prescribed by the instruction means and the actual rotation speed of the prime mover that is detected by the rotation speed sensor, computing the maximum absorption torque available to the first and second hydraulic pumps in accordance with the rotation speed deviation, the target rotation speed prescribed by the instruction means, and the delivery pressure of the third hydraulic pump that is detected by the pressure sensor, and outputting a control signal according to the computation results; wherein the first regulator controls the displacements of the first and second hydraulic pumps in accordance with the control signal to ensure that the absorption torques of the first and second hydraulic pumps do not exceed the maximum absorption torque computed by the control means.

Consequently, three-pump torque control can be exercised in accordance with the accurately determined absorption torque of the third hydraulic pump as described in (1) above. This makes it possible to accurately control the total absorption torque of the first, second, and third hydraulic pumps and effectively use the output torque of the engine.

Further, since the control means computes the deviation between the target rotation speed prescribed by the instruction means and the actual rotation speed of the prime mover that is detected by the rotation sensor, and computes the maximum absorption torque available to the first and second hydraulic pumps in accordance, for instance, with the rotation speed deviation, speed sensing control can be exercised to increase or decrease the maximum absorption torque available to the first and second hydraulic pumps in accordance with a change in the rotation speed deviation. Therefore, effects produced by speed sensing control (e.g., effects of torque decrease control and torque increase control) can be obtained. Further, since the same control means performs computations for three-pump torque control and speed sensing control and uses one control signal to provide both of these types of control, speed sensing control can be exercised with a simple configuration during three-pump torque control.

(3) According to another aspect of the present invention, there is provided the torque control apparatus as described in (1) or (2) above, wherein the control means includes first means for computing a pump base torque, which is the total maximum absorption torque available to the first, second, and third hydraulic pumps, in accordance with the target rotation speed; second means in which a reference absorption torque for the third hydraulic pump is preset; third means for computing the difference between the current absorption torque of the third hydraulic pump and the reference absorption torque as a correction torque value in accordance with the delivery pressure of the third hydraulic pump; and fourth means for computing the maximum absorption torque available to the first and second hydraulic pumps by using the pump base torque computed by the first means, the reference absorption torque for the third hydraulic pump that is preset in the second means, and the correction torque value computed by the third means.

As described above, when the difference between the current absorption torque of the third hydraulic pump and the reference absorption torque is computed as the correction torque value in accordance with the delivery pressure of the third hydraulic pump with the reference absorption torque for the third hydraulic pump preset, it is possible to compute the maximum absorption torque available to the first and second hydraulic pumps as the value obtained by subtracting the current torque of the third hydraulic pump from the pump base torque and provide three-pump torque control according to the accurately determined absorption torque of the third hydraulic pump.

(4) According to another aspect of the present invention, there is provided the torque control apparatus as described in (3) above, wherein the second means sets, as the reference absorption torque for the third hydraulic pump, the absorption torque of the third hydraulic pump prevailing at the minimum delivery pressure within the delivery pressure range of the third hydraulic pump over which absorption torque control is provided by the second regulator.

Consequently, the third means can set the correction torque value with reference to the absorption torque of the third hydraulic pump prevailing at the minimum delivery pressure within the delivery pressure range of the third hydraulic pump over which absorption torque control is provided by the second regulator. This makes it easy to set and calculate the correction torque value.

(5) According to another aspect of the present invention, there is provided the torque control apparatus as described in (3) above, wherein the fourth means computes the reference value for the maximum absorption torque available to the first and second hydraulic pumps by subtracting the reference absorption torque for the third hydraulic pump, which is set in the second means, from the pump base torque computed by the first means, and computes the maximum absorption torque available to the first and second hydraulic pumps by adding the correction torque value computed by the third means to the reference value for the maximum absorption torque.

Consequently, the fourth means can calculate the maximum absorption torque available to the first and second hydraulic pumps by using the pump base torque computed by the first means, the reference absorption torque for the third hydraulic pump that is set in the second means, and the correction torque value computed by the third means.

(6) According to another aspect of the present invention, there is provided the torque control apparatus as described in (1) or (2) above, wherein the control means includes first means for computing the pump base torque, which is the total maximum absorption torque available to the first, second, and third hydraulic pumps, in accordance with the target rotation speed; second means for computing the current absorption torque of the third hydraulic pump in accordance with the delivery pressure of the third hydraulic pump; and third means for computing the maximum absorption torque available to the first and second hydraulic pumps by subtracting the current absorption torque of the third hydraulic pump, which is computed by the second means, from the pump base torque computed by the first means.

Consequently, the maximum absorption torque available to the first and second hydraulic pumps can be computed by subtracting the current absorption torque of the third hydraulic pump from the pump base torque. This makes it possible to provide three-pump torque control according to the accurately determined absorption torque of the third hydraulic pump.

(7) According to another aspect of the present invention, there is provided the torque control apparatus as described in (2) above, wherein the control means includes fifth means for computing a first target value for the maximum absorption torque available to the first and second hydraulic pumps in accordance with the target rotation speed prescribed by the instruction means and the delivery pressure of the third hydraulic pump that is detected by the pressure sensor; sixth means for computing a torque correction value in accordance with the rotation speed deviation; and seventh means for computing a second target value for the maximum absorption torque available to the first and second hydraulic pumps by adding the torque correction value to the first target value for the maximum absorption torque computed by the fifth means; and outputs the control signal in accordance with the second target value computed by the seventh means.

Consequently, speed sensing control can be provided to increase or decrease the maximum absorption torque available to the first and second hydraulic pumps in accordance with a change in the rotation speed deviation.

(8) According to another aspect of the present invention, there is provided the torque control apparatus as described in (7) above, wherein the fifth means includes first means for computing the pump base torque, which is the total maximum absorption torque available to the first, second, and third hydraulic pumps, in accordance with the target rotation speed; second means in which the reference absorption torque for the third hydraulic pump is preset; third means for computing the difference between the current absorption torque of the third hydraulic pump and the reference absorption torque as the correction torque value in accordance with the delivery pressure of the third hydraulic pump; and fourth means for computing the first target value for the maximum absorption torque available to the first and second hydraulic pumps by using the pump base torque computed by the first means, the reference absorption torque for the third hydraulic pump that is set in the second means, and the correction torque value computed by the third means.

(9) According to still another aspect of the present invention, there is provided the torque control apparatus as described in (7) above, wherein the fifth means includes first means for computing the pump base torque, which is the total maximum absorption torque available to the first, second, and third hydraulic pumps, in accordance with the target rotation speed; second means for computing the current absorption torque of the third hydraulic pump in accordance with the delivery pressure of the third hydraulic pump; and third means for computing the first target value for the maximum absorption torque available to the first and second hydraulic pumps by subtracting the current absorption torque of the third hydraulic pump, which is computed by the second means, from the pump base torque computed by the first means.

Advantages of the Invention

The present invention makes it possible to provide three-pump torque control according to an accurately determined absorption torque of the third hydraulic pump, accurately control the total absorption torque of the first, second, and third hydraulic pumps, and effectively use the output torque of the engine.

The present invention also makes it possible to provide speed sensing control for the purpose of increasing or decreasing the maximum absorption torque available to the first and second hydraulic pumps in accordance with a change in the prime mover rotation speed deviation. Further, effects produced by speed sensing control (e.g., effects of torque decrease control and torque increase control) can be obtained.

Moreover, since the same control means performs computations for three-pump torque control and speed sensing control and uses one control signal to provide both of these types of control, speed sensing control can be exercised with a simple configuration during three-pump torque control.

BRIEF DESCRIPTION OF DRAWINGS

FIG. 6A shows the relationship between the delivery pressure of a third hydraulic pump (third pump delivery pressure), the displacement of the third hydraulic pump (third pump displacement), and the reference absorption torque for the third hydraulic pump, and is similar to FIG. 3. FIG. 6B shows the relationship between the third pump delivery pressure and the absorption torque of the third hydraulic pump (consumption torque). FIG. 6C shows the relationship between the third pump delivery pressure and correction torque value.

DESCRIPTION OF REFERENCE NUMERALS

Figure 1:
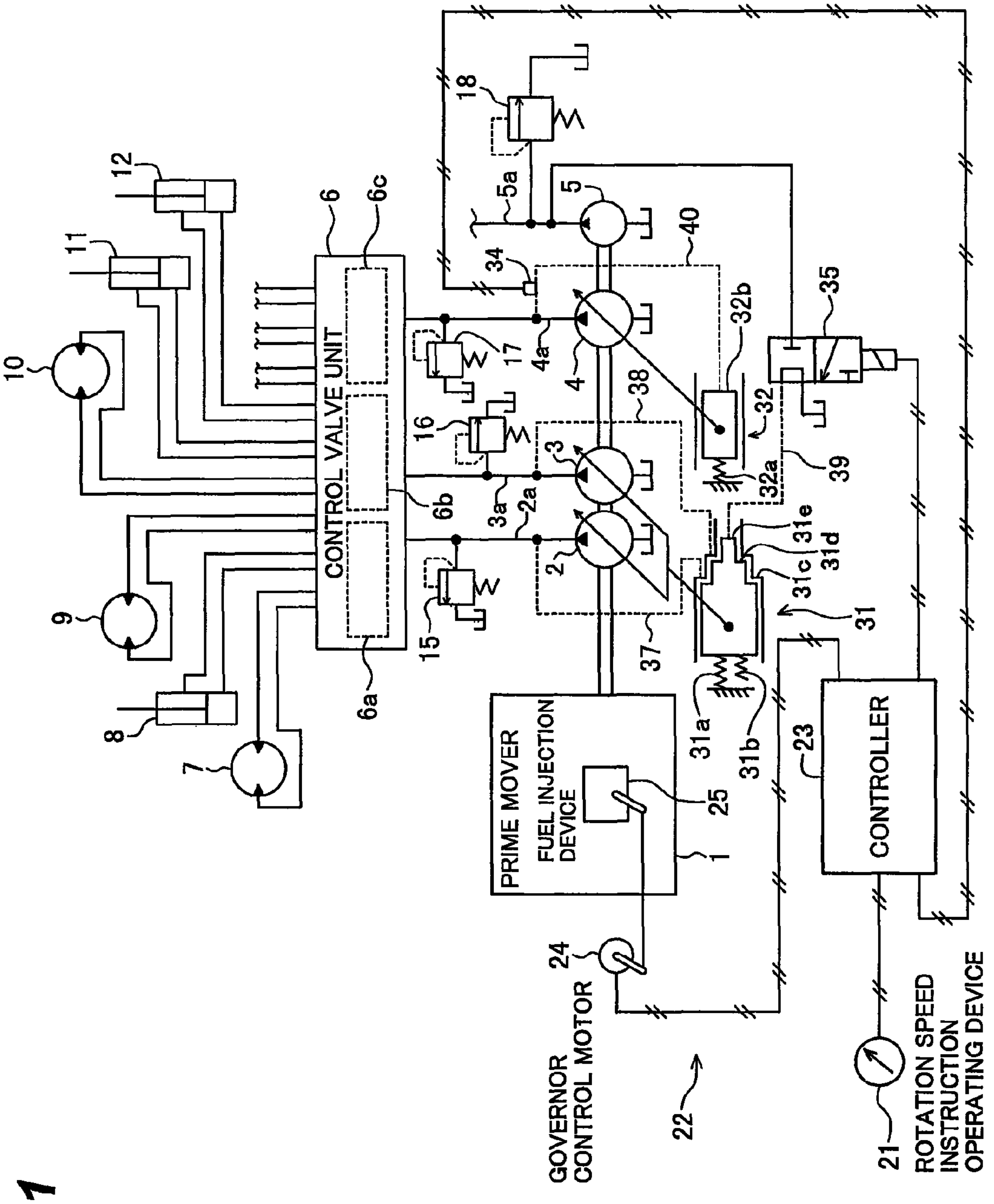
FIG. 1 is a diagram illustrating the overall configuration of a construction machine three-pump system having a torque control apparatus according to a first embodiment of the present invention.

1: Prime mover (engine)
2: First hydraulic pump
3: Second hydraulic pump
4: Third hydraulic pump
6: Control valve unit
6*a*, 6*b*, 6*c*: Valve group
7-12: Plural hydraulic actuators
15, 16, 17: Main relief valve
18: Pilot relief valve
21: Rotation speed instruction operating device
22: Engine control device
23, 23A, 23B: Controller
24: Governor control motor
25: Fuel injection device
31: First regulator
31*a*, 31*b*: Spring
31*c*, 31*d*, 31*e*: Pressure reception section
32: Second regulator
34: Pressure sensor
35: Solenoid proportional valve
42: Pump base torque computation section
43: Third pump reference absorption torque setup section
44: Subtraction section
45: Correction torque computation section
45A: Third pump absorption torque computation section
46: Addition section
46A: Subtraction section
47: Solenoid valve output pressure computation section
48: Solenoid valve drive current computation section
51: Rotation speed sensor
52: Subtraction section
53: Gain multiplication section
54: Addition section
131: First regulator
132: Second regulator
112, 212: Tilt control actuator
113, 213: Torque control servo valve
113*d*: Torque decrease control pressure reception chamber
114, 214: Position control valve

BEST MODE FOR CARRYING OUT THE INVENTION

Embodiments of the present invention will now be described with reference to the accompanying drawings.

FIG. 1 is a diagram illustrating the overall configuration of a construction machine three-pump system having a torque control apparatus according to an embodiment of the present invention. The present embodiment assumes that a hydraulic excavator is used as a construction machine.

Referring to FIG. 1, the construction machine three-pump system according to the present embodiment includes a prime mover 1, three variable displacement main pumps (a first hydraulic pump 2, a second hydraulic pump 3, and a third hydraulic pump 4) driven by the prime mover 1, a fixed displacement pilot pump 5 driven by the prime mover 1, a control valve unit 6 connected to the first, second, and third hydraulic pumps 2, 3, 4, and a plurality of hydraulic actuators 7, 8, 9, 10, 11, 12, . . . connected to the control valve unit 6.

The control valve unit 6 has three valve groups 6*a*, 6*b*, 6*c*, which correspond to the first, second, and third hydraulic pumps 2, 3, 4. Each of the three valve groups 6*a*, 6*b*, 6*c* includes a plurality of flow control valves. The flow control valves control the flow (direction and flow rate) of hydraulic fluid that is supplied from the first, second, and third hydraulic pumps 2, 3, 4 to the plurality of hydraulic actuators 7, 8, 9, 10, 11, 12, . . . . The flow control valves for the three valve groups 6*a*, 6*b*, 6*c* are of a center bypass type. When a flow control valve is placed in neutral position and the operating means (control lever device) of an associated hydraulic actuator is not operated, delivery lines 2*a*, 3*a*, 4*a* of the first, second, and third hydraulic pumps 2, 3, 4 communicate with a tank. In this state, the delivery pressures of the first, second, and third hydraulic pumps 2, 3, 4 decrease to a tank pressure.

The plurality of hydraulic actuators 7, 8, 9, 10, 11, 12, . . . include, for instance, a swing motor, arm cylinder, left and right track motors, bucket cylinder, and boom cylinder for the hydraulic excavator. For example, hydraulic actuator 7 is a swing motor; hydraulic actuator 8 is an arm cylinder; hydraulic actuator 9 is a left track motor; hydraulic actuator 10 is a right track motor; hydraulic actuator 11 is a bucket cylinder; and hydraulic actuator 12 is a boom cylinder.

The delivery lines 2*a*, 3*a*, 4*a* of the first, second, and third hydraulic pumps 2, 3, 4 are provided with main relief valves 15, 16, 17. A delivery line 5*a* for the pilot pump 5 is provided with a pilot relief valve 18. The main relief valves 15, 16, 17 regulate the delivery pressures of the first, second, and third hydraulic pumps 2, 3, 4, and sets the maximum pressure of a main circuit. The pilot relief valve 18 regulates the maximum delivery pressure of the pilot pump 5 and sets the pressure of a pilot hydraulic source.

The prime mover 1 is a diesel engine. The diesel engine (hereinafter simply referred to as the engine) 1 is provided with a dial-type rotation speed instruction operating device 21 and an engine control device 22. The rotation speed instruction operating device 21 is instruction means for prescribing a target rotation speed for the engine 1. The engine control device 22 includes a controller 23, a governor control motor 24, and a fuel injection device (governor) 25. The controller 23 inputs an instruction signal from the rotation speed instruction operating device 21, performs a predetermined computation process, and outputs a drive signal to the governor control motor 24. The governor control motor 24 rotates in accordance with the drive signal and controls the fuel injection amount of the fuel injection device 25 to obtain the target rotation speed prescribed by the rotation speed instruction operating device 21.

The torque control apparatus according to the present embodiment is provided for the three-pump system described above, and includes a first regulator 31, a second regulator 32, a pressure sensor 34, a solenoid proportional valve 35, and the aforementioned controller 23. The first regulator 31 controls the absorption torques (consumption torques) of the first and second hydraulic pumps 2, 3 by controlling the displacements (displacement volumes or swash plate tilting amounts) of the first and second hydraulic pumps 2, 3. The second regulator 32 controls the absorption torque (consumption torque) of the third hydraulic pump 4 by controlling the displacement (displacement volume or swash plate tilting amount) of the third hydraulic pump 4. The pressure sensor 34 detects the delivery pressure of the third hydraulic pump 4.

The first regulator 31 includes springs 31*a*, 31*b*, which operate in the displacement increase direction of the first and second hydraulic pumps 2, 3, and pressure reception sections 31*c*, 31*d*, 31*e*, which operate in the displacement decrease direction of the first and second hydraulic pumps 2, 3. The delivery pressures of the first and second hydraulic pumps 2, 3 are directed to pressure reception sections 31*c* and 31*d* through pilot lines 37, 38. Control pressure from the solenoid proportional valve 35 is directed to pressure reception section 31*e* through a control hydraulic line 39. The springs 31*a*, 31*b* and pressure reception section 31*e* are capable of setting the maximum absorption torque available to the first and second hydraulic pumps 2, 3. The first regulator 31, which is configured as described above, controls the displacements of the first and second hydraulic pumps 2, 3 so that the absorption torques of the first and second hydraulic pumps 2, 3 do not exceed the maximum absorption torque, which is set by the springs 31*a*, 31*b* and the control pressure directed to pressure reception section 31*e*.

The second regulator 32 includes a spring 32*a*, which operates in the displacement increase direction of the third hydraulic pump 4, and a pressure reception section 32*b*, which operates in the displacement decrease direction of the third hydraulic pump 4. The delivery pressure of the third hydraulic pump 4 is directed to the pressure reception section 31*b* through a pilot line 40. The spring 32*a* is capable of setting the maximum absorption torque available to the third hydraulic pump 4. The second regulator 32, which is configured as described above, controls the displacement of the third hydraulic pump 4 so that the absorption torque of the third hydraulic pump 4 does not exceed the maximum absorption torque, which is set by the spring 32*a*.

The pressure sensor 34 outputs a detection signal according to the delivery pressure of the third hydraulic pump 4. This detection signal enters the controller 23. The controller 23 performs a predetermined computation process and outputs a drive signal to the solenoid proportional valve 35. The solenoid proportional valve 35 generates a control pressure according to the drive signal from the controller 23 by using the delivery pressure of the pilot pump 5 as a source pressure. The control pressure is then directed to the pressure reception section 31*e* of the first regulator 31 through a signal line 39. This causes the first regulator 31 to adjust the maximum absorption torque available to the first and second hydraulic pumps in accordance with the control pressure directed to the pressure reception section 31*e*.

Figure 2:
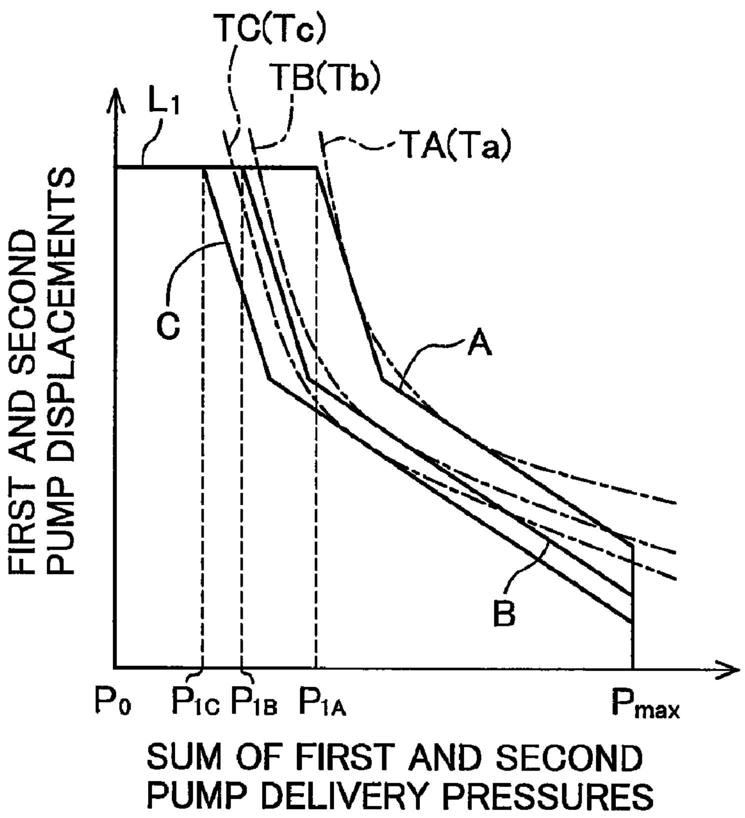
FIG. 2 shows the torque control characteristics of a first regulator shown in FIG. 1.

FIG. 2 is a graph illustrating the torque control characteristics of the first regulator 31. The horizontal axis indicates the sum of delivery pressures of the first and second hydraulic pumps 2, 3. The vertical axis indicates the displacements (displacement volumes or swash plate tilting amounts) of the first and second hydraulic pumps 2, 3.

Polygonal lines A, B, and C in FIG. 2 are characteristic curves of absorption torque control (input torque limiting control) provided by the first regulator 31. Polygonal line A prevails when hydraulic actuator 12 or other hydraulic actuator related to the third hydraulic pump 4 is not operating and the delivery pressure of the third hydraulic pump 4 is reduced to a tank pressure P0 (see FIG. 3). Polygonal line B prevails when the delivery pressure of the third hydraulic pump 4 is equal to the minimum delivery pressure P1 (see FIG. 3) within the delivery pressure range of the third hydraulic pump 4 over which absorption torque control is provided by the second regulator 32 (the absorption torque control start pressure P1 for the second regulator 32). Polygonal line C prevails when the delivery pressure of the third hydraulic pump 4 is equal to P2 (see FIG. 3) at which the difference from the absorption torque of the third hydraulic pump 4 (third pump reference absorption torque T3 r) at pressure P1 is maximized.

When the delivery pressure of the third hydraulic pump 4 is equal to the tank pressure P0, the displacements of the first and second hydraulic pumps 2, 3 change as described below in accordance with the sum of the delivery pressures of the first and second hydraulic pumps 2, 3.

While the sum of the delivery pressures of the first and second hydraulic pumps 2, 3 is within the range of P0 to P1A, absorption torque control is not exercised. Therefore, the displacements of the first and second hydraulic pumps 2, 3 stay on a maximum displacement characteristic line L1 and remain maximized (fixed). In this instance, the absorption torques of the first and second hydraulic pumps 2, 3 increase with an increase in their delivery pressures. Absorption torque control is exercised when the sum of the delivery pressures of the first and second hydraulic pumps 2, 3 exceeds P1A. Therefore, the displacements of the first and second hydraulic pumps 2, 3 decrease along characteristic line A. This provides control so that the absorption torques of the first and second hydraulic pumps 2, 3 do not exceed a prescribed torque Ta indicated by a constant torque curve TA. In this instance, pressure P1A is the pressure at which the first regulator 31 starts exercising absorption torque control. The range of P1A to Pmax is the delivery pressure range of the first and second hydraulic pumps 2, 3 over which absorption torque control is provided by the first regulator 31. The value Pmax represents the maximum sum of the delivery pressures of the first and second hydraulic pumps 2, 3 and corresponds to the sum of relief pressure settings for the main relief valves 15, 16. When the sum of the delivery pressures of the first and second hydraulic pumps 2, 3 increases to Pmax, the main relief valves 15, 16 both operate to limit a further increase in the pump delivery pressures.

When the delivery pressure of the third hydraulic pump 4 rises, the characteristic line of absorption torque control changes to polygonal lines A, B, and C. Then, the pressure at which the first regulator 31 starts exercising absorption torque control changes from P1A through P1B to P1C accordingly. Further, the delivery pressure range over which absorption torque control is provided by the first regulator 31 changes from P1A-Pmax through P1B-Pmax to P1C-Pmax. In addition, the maximum absorption torque available to the first and second hydraulic pumps 2, 3 decreases from Ta through Tb to Tc accordingly.

Figure 3:
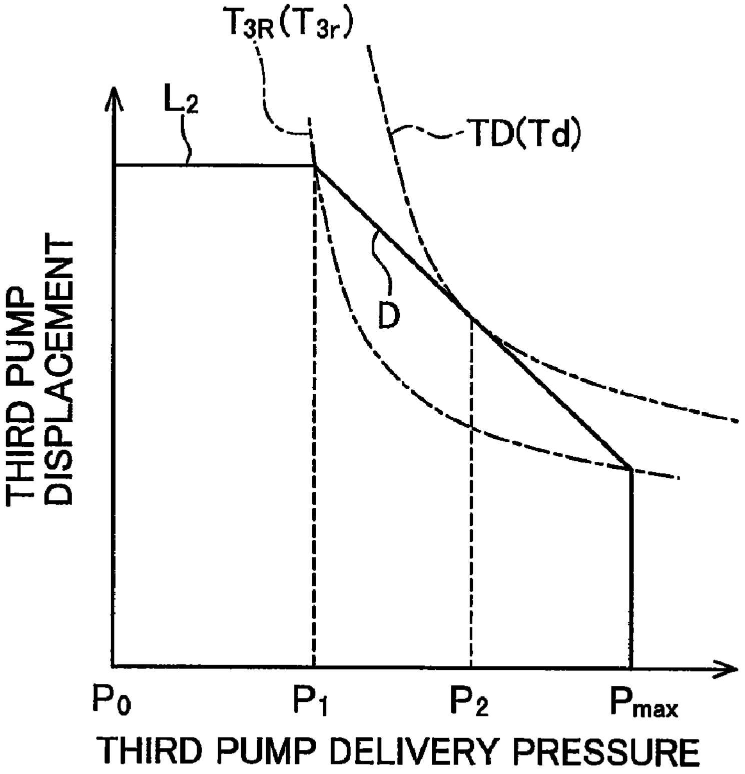
FIG. 3 shows the torque control characteristics of a second regulator shown in FIG. 1.

FIG. 3 is a graph illustrating the torque control characteristics of the second regulator 32. The horizontal axis indicates the delivery pressure of the third hydraulic pump 4. The vertical axis indicates the displacement (displacement volume or swash plate tilting amount) of the third hydraulic pump 4. A solid line D is a characteristic line of absorption torque control, which is set by the spring 32*a*.

While the delivery pressure of the third hydraulic pump 4 is within the range of P0 to P1, absorption torque control is not exercised. Therefore, the displacement of the third hydraulic pump 4 stays on a maximum displacement characteristic line L2 and remains maximized (fixed). In this instance, the absorption torque of the third hydraulic pump 4 increases with an increase in its delivery pressure. Absorption torque control is exercised when the delivery pressure of the third hydraulic pump 4 exceeds P1. The displacement of the third hydraulic pump 4 then decreases along characteristic line C. This provides control so that the absorption torque of the third hydraulic pump 4 does not exceed a prescribed torque Td indicated by a constant torque curve TD. In this instance, pressure P1 is the pressure at which the second regulator 32 starts exercising absorption torque control. The range of P1 to Pmax is the delivery pressure range of the third hydraulic pump 4 over which absorption torque control is provided by the second regulator 32. The value Pmax represents the maximum delivery pressure of the third hydraulic pump 4 and corresponds to the relief pressure setting for the main relief valve 17. When the delivery pressure of the third hydraulic pump 4 increases to Pmax, the main relief valve 17 operates to limit a further increase in the pump delivery pressure.

Figure 4:
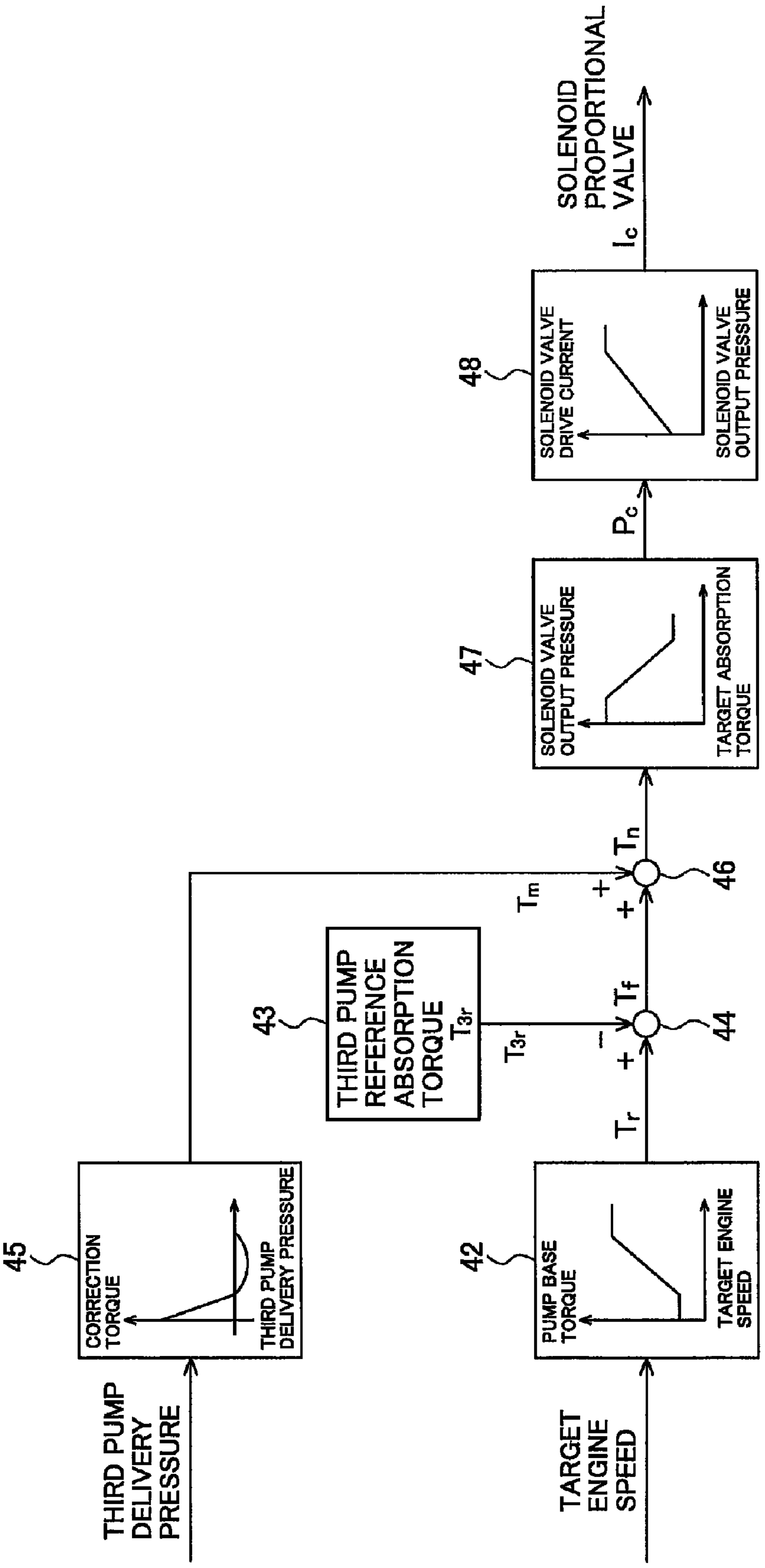
FIG. 4 is a functional block diagram illustrating a controller's processing function related to the torque control apparatus.

FIG. 4 is a functional block diagram illustrating a processing function to be performed by a controller 23 for the torque control apparatus. The controller 23 includes a pump base torque computation section 42, a third pump reference absorption torque setup section 43, a subtraction section 44, a correction torque computation section 45, an addition section 46, a solenoid valve output pressure computation section 47, and a solenoid valve drive current computation section 48.

The pump base torque computation section 42 calculates a pump base torque Tr that represents the total maximum absorption torque available to the first, second, and third hydraulic pumps 2, 3, 4. This section 42 inputs an instruction signal for a target rotation speed from the rotation speed instruction operating device 21, causes a table stored in a memory to reference the instruction signal, and computes the pump base torque Tr that corresponds to the target rotation speed. The table in the memory predefines the relationship between the target rotation speed and pump base torque Tr so that the pump base torque Tr decreases with a decrease in the target rotation speed.

Figure 5:
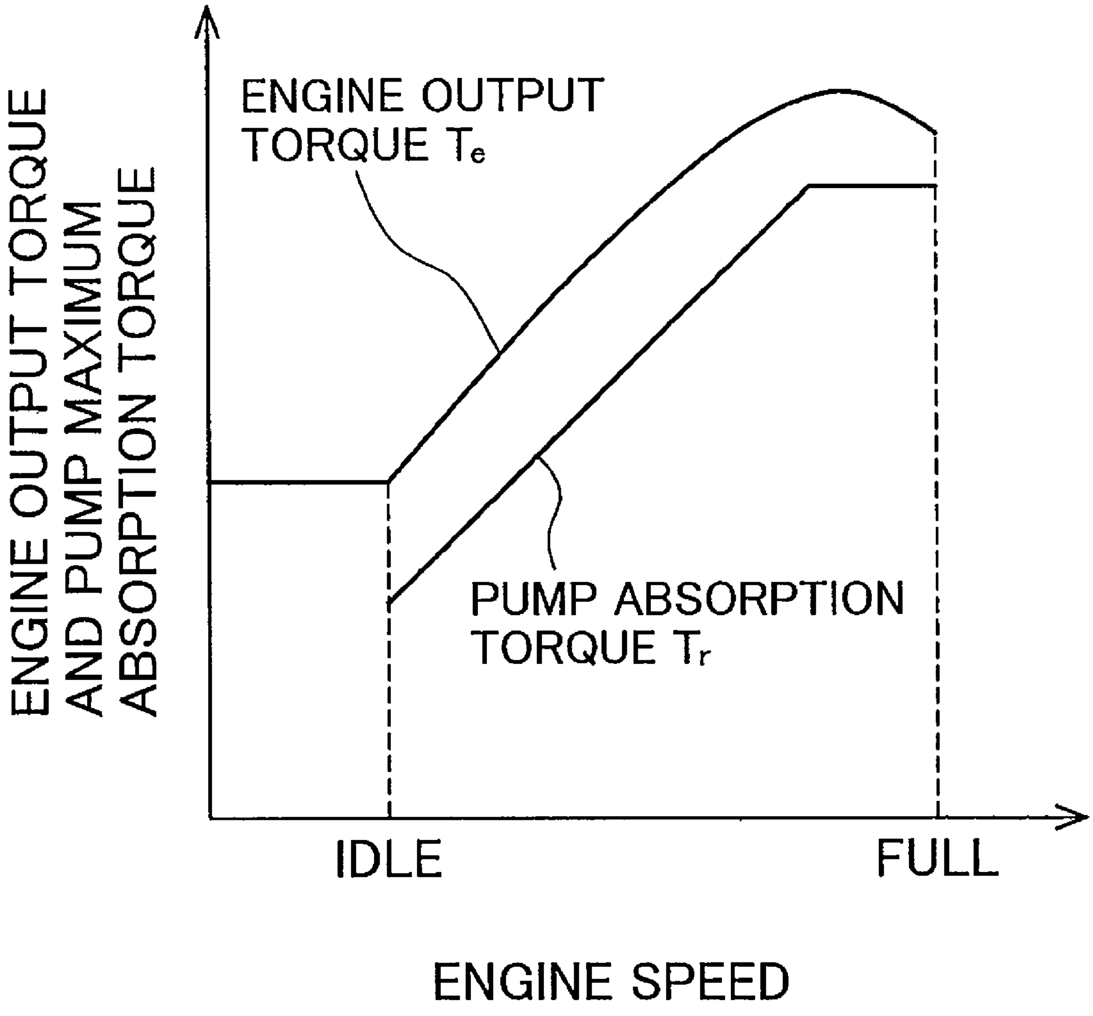
FIG. 5 shows the relationship between engine output torque and pump base torque (pump maximum absorption torque).

FIG. 5 shows the relationship between engine output torque Te and pump base torque (pump maximum absorption torque) Tr. The output torque Te of the engine 1 decreases with a decrease in the engine rotation speed. The pump maximum absorption torque Tr needs to be within the range of the output torque Te of the engine 1. Therefore, the pump maximum absorption torque Tr also decreases with a decrease in the target rotation speed.

The third pump reference absorption torque setup section 43 sets the third pump reference absorption torque T3r as the reference value for calculating the actual absorption torque (consumption torque) of the third hydraulic pump 4. The third pump reference absorption torque T3r is a torque value that is indicated by a constant torque curve $T_{3R}$ in FIG. 3. This torque value represents the absorption torque of the third hydraulic pump 4 that prevails at the minimum delivery pressure P1 within the delivery pressure range of the third hydraulic pump 4 over which absorption torque control is provided by the second regulator 32 (hereinafter referred to as the absorption torque control start pressure P1 for the second regulator 32).

The subtraction section 44 subtracts the third pump reference absorption torque T3r from the pump base torque Tr to calculate a reference value Tf for the maximum absorption torque available to the first and second hydraulic pumps 2, 3, that is, performs the following calculation:

$$Tf=Tr-T3r$$

The correction torque computation section 45 calculates the difference between the current absorption torque (consumption torque) of the third hydraulic pump 4 and the third pump reference absorption torque T3r from the delivery pressure of a fourth hydraulic pump as a correction torque value. This section 45 inputs a detection signal about the delivery pressure of the third hydraulic pump 4 (third pump delivery pressure) from the pressure sensor 34, causes a table stored in a memory to reference the detection signal, and computes the correction torque value Tm that corresponds to the third pump delivery pressure. The table in the memory predefines the relationship between the third pump delivery pressure and the correction torque value Tm so that the correction torque value Tm decreases from T0 to 0 in accordance with an increase in the third pump delivery pressure while the third pump delivery pressure is within the range of P0 to absorption torque control start pressure P1, and becomes a predefined negative value according to the third pump delivery pressure when the third pump delivery pressure exceeds the absorption torque control start pressure P1.

Figure 6A:
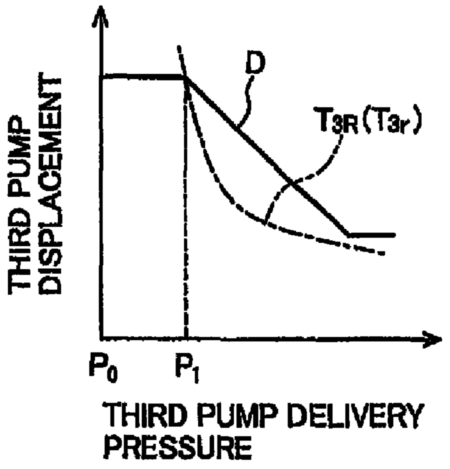
FIGS. 6A to 6C illustrate a correction torque value.
Figure 6B:
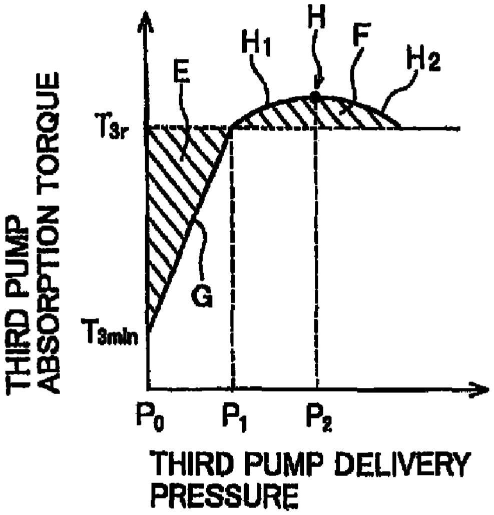
Figure 6C:
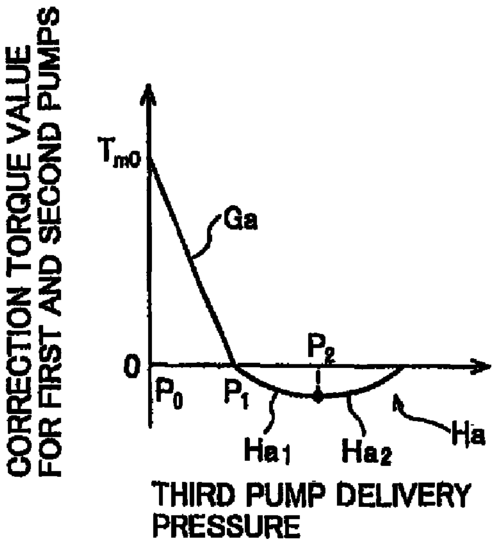

FIGS. 6A to 6C illustrate the correction torque value Tm. The correction torque value Tm will now be described with reference to FIGS. 6A to 6C.

FIG. 6A shows the relationship between the delivery pressure of the third hydraulic pump 4 (third pump delivery pressure), the displacement of the third hydraulic pump 4 (third pump displacement), and the third pump reference absorption torque T3r, and is similar to FIG. 3.

Referring to FIG. 6A, the third pump displacement is maximized (fixed) while the third pump delivery pressure is within the range of P0 to P1, and decreases along characteristic line d when the third pump delivery pressure exceeds P1, as described with reference to FIG. 3. When the third pump delivery pressure exceeds P1, the second regulator 32 starts exercising absorption torque control. This absorption torque control should ideally be exercised so that the actual absorption torque of the third hydraulic pump 4 remains at a fixed value (third pump reference absorption torque T3r) as indicated by the constant torque curve TR. However, the setting value for absorption torque control by the second regulator 32 is given by the force of the spring 32*a*. In reali ty, therefore, the absorption torque of the third hydraulic pump 4 is controlled as indicated by characteristic line C. There is an error between the controlled absorption torque and the ideal third pump reference absorption torque T3r indicated by a constant torque curve T3R.

FIG. 6B shows the relationship between the third pump delivery pressure and the absorption torque of the third hydraulic pump 4 (consumption torque). Shaded area F represents an error between the ideal third pump reference absorption torque T3r and the actual absorption torque of the third hydraulic pump 4. Shaded area E represents a region where the absorption torque of the third hydraulic pump 4 disagrees with the third pump reference absorption torque T3r while the delivery pressure of the third hydraulic pump 4 is within the range of P0 to P1. When the third pump delivery pressure is equal to the tank pressure P0, the absorption torque of the third hydraulic pump 4 is minimized to T3 min. When the third pump delivery pressure rises from P0 to P1, the absorption torque of the third hydraulic pump 4 proportionally increases from T3 min to T3r as indicated by a straight line G. In this instance, the absorption torque of the third hydraulic pump 4 is considerably lower than the third pump reference absorption torque T3r. When the reference value Tf (=Tr−T3r) computed by the subtraction section 44 is directly set as the maximum absorption torque available to the first and second hydraulic pumps 2, 3, the pump base torque Tr cannot be used up.

Referring to FIG. 6B, when the third pump delivery pressure exceeds P1, the absorption torque of the third hydraulic pump 4 changes as indicated by a curve H in accordance with the difference between characteristic line C and the constant torque curve T3R in FIG. 6A. More specifically, when the third pump delivery pressure exceeds P1, the absorption torque of the third hydraulic pump 4 becomes higher than T3r and the difference from T3r increases with an increase in the third pump delivery pressure. When the third pump delivery pressure reaches P2, the difference from T3r is maximized. When the third pump delivery pressure exceeds P2, the difference from T3r gradually decreases. In this instance, the absorption torque of the third hydraulic pump 4 is considerably higher than the third pump reference absorption torque T3r. When the reference value Tf (=Tr−T3r) computed by the subtraction section 44 is directly set as the maximum absorption torque available to the first and second hydraulic pumps 2, 3, an excess torque, which is higher than the pump base torque Tr, results.

FIG. 6C shows the relationship between the third pump delivery pressure and the correction torque value Tm. This relationship represents a characteristic that is the reversal of a characteristic indicated by the relationship between the third pump delivery pressure shown in FIG. 6B and the actual absorption torque of the third hydraulic pump 4. Straight line Ga in FIG. 6C corresponds to straight line G in FIG. 6B, whereas curve Ha in FIG. 6C corresponds to curve H in FIG. 6B. When the third pump delivery pressure is equal to the tank pressure P0, the correction torque value Tm is Tm0, which represents the difference between T3r and T3 min in FIG. 6B. This can be expressed as follows:

$$Tm0=T3r-T3\min$$

While the third pump delivery pressure increases from P0 to P1, the correction torque value Tm proportionally decreases from Tm0 to 0 in accordance with an increase in the third pump delivery pressure as indicated by straight line Ga. When the third pump delivery pressure exceeds P1, the correction torque value Tm becomes a negative value and changes as indicated by curve Ha. More specifically, the correction torque value Tm gradually decreases from 0 within its actuator region when the third pump delivery pressure rises, becomes minimized when the third pump delivery pressure reaches P2, and gradually increases and reverts to a value close to 0 when the third pump delivery pressure exceeds P2.

The addition section 46 calculates a target absorption torque Tn, which is the maximum absorption torque available to the first and second hydraulic pumps 2, 3, by adding the correction torque value Tm computed by the correction torque computation section 45 to the maximum absorption torque reference value Tf determined by the subtraction section 44. This can be expressed as follows:

$$Tn=Tf+Tm$$

Figure 7:
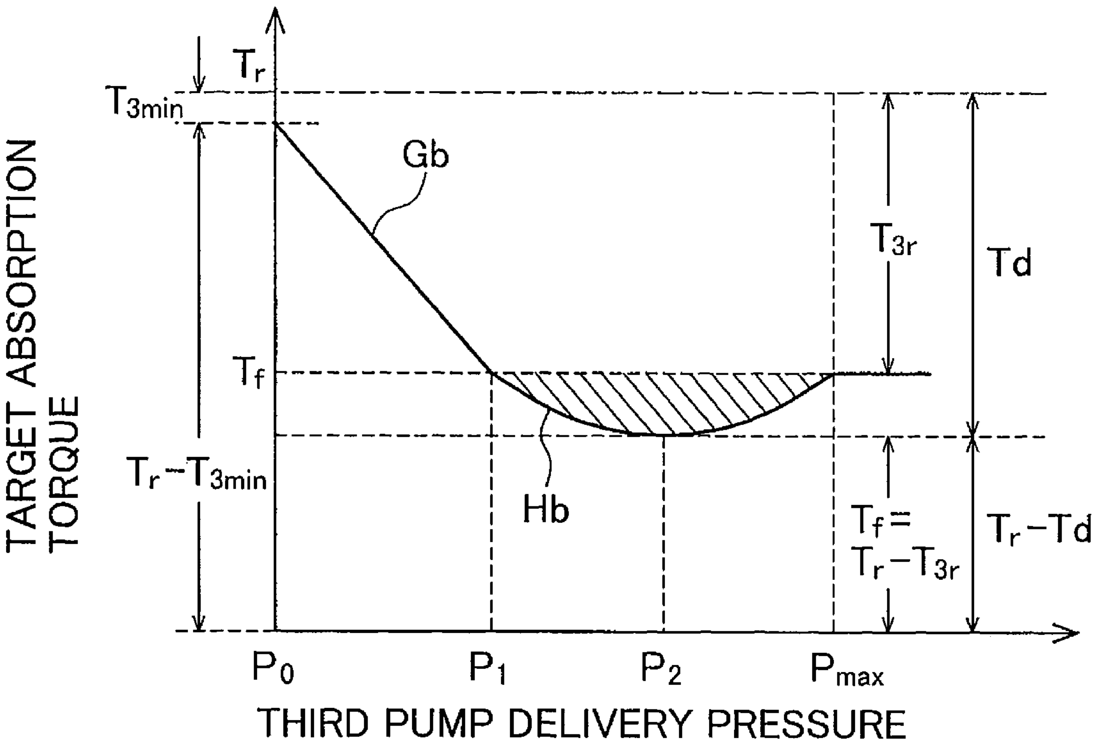
FIG. 7 shows the relationship between the delivery pressure of the third hydraulic pump and a target absorption torque (the maximum absorption torque available to a first hydraulic pump and a second hydraulic pump).

FIG. 7 shows the relationship between the delivery pressure of the third hydraulic pump 4 and the target absorption torque Tn (the maximum absorption torque available to the first and second hydraulic pumps 2, 3). In FIG. 7, the one-dot chain line indicates the pump base torque Tr computed by the pump base torque computation section 42, whereas the two-dot chain line indicates the reference value Tf for the maximum absorption torque available to the first and second hydraulic pumps 2, 3, which is computed by the subtraction section 44. The pump base torque Tr indicated by the one-dot chain line is computed when the target rotation speed for the engine 1 takes on a particular value (e.g., maximum rated rotation speed). The reference value Tf indicated by the two-dot chain line is obtained by subtracting the third pump reference absorption torque T3r from the pump base torque Tr indicated by the one-dot chain line (Tf=Tr−T3r).

The target absorption torque Tn computed by the addition section 46 is obtained by adding the correction torque value Tm, which is computed by the correction torque computation section 45, to the reference value Tf indicated by the two-dot chain line (Tn=Tf+Tm), and indicated by straight line Gb and curve Hb in accordance with the relationship between the third pump delivery pressure and the correction torque value Tm, which is shown in FIG. 6C. Straight line Gb and curve Hb correspond to straight line Ga and curve Ha in FIG. 6C, which indicates the correction torque value Tm.

When the third pump delivery pressure is P0, the target absorption torque Tn is equal to Tr−T3min. When the third pump delivery pressure rises from P0 to P1, the target absorption torque Tn decreases from Tr−T3min to Tf along straight line Gb. After the third pump delivery pressure exceeds P1, the target absorption torque Tn decreases along curve Hb in accordance with an increase in the third pump delivery pressure. When the third pump delivery pressure reaches P2, the target absorption torque Tn is minimized to Tr−Tc. When the third pump delivery pressure further rises, the target absorption torque Tn begins to increase along curve Hb. When the third pump delivery pressure reaches Pmax, the target absorption torque Tn reverts to a value close to Tf.

The solenoid valve output pressure computation section 47 calculates a control pressure for causing the first regulator 31 to set the target torque Tn as the maximum absorption torque available to the first and second hydraulic pumps 2, 3. This section 47 causes a table stored in a memory to reference the target absorption torque Tn determined by the addition section 46, and computes an output pressure Pc of the solenoid proportional valve 35 that corresponds to the target absorption torque Tn. The table in the memory predefines the relationship between the target absorption torque Tn and the output pressure Pc so that the output pressure Pc decreases with an increase in the target absorption torque Tn.

The solenoid valve drive current computation section 48 calculates a drive current Ic for the solenoid proportional valve 35 that is required to obtain the output pressure Pc of the solenoid proportional valve 35, which is determined by the solenoid valve output pressure computation section 47. This section 48 causes a table stored in a memory to reference the output pressure Pc of the solenoid proportional valve 35 that is determined by the solenoid valve output pressure computation section 47, and computes the drive current Ic for the solenoid proportional valve 35 that corresponds to the output pressure Pc. The table in the memory predefines the relationship between the output pressure Pc and the drive current Ic so that the drive current Ic increases with an increase in the output pressure Pc. The drive current Ic is amplified by an amplifier (not shown) and output to the solenoid proportional valve 35.

The dial-type rotation speed instruction operating device 21 constitutes instruction means for prescribing a target rotation speed for the engine (prime mover) 1. The engine control device 22 constitutes a prime mover control device for controlling the rotation speed of the engine 1 in accordance with the target rotation speed prescribed by the instruction means 21. The controller 23 and solenoid proportional valve 35 constitute control means that computes the maximum absorption torque available to the first and second hydraulic pumps 2, 3 in accordance with the target rotation speed prescribed by the instruction means 21 and the delivery pressure of the third hydraulic pump 4 that is detected by the pressure sensor 34, and outputs a control signal according to the computation result. The first regulator 31 complies with the control signal and controls the displacements of the first and second hydraulic pumps 2, 3 so that the absorption torques of the first and second hydraulic pumps 2, 3 do not exceed the maximum absorption torque computed by the control means 23, 35.

The pump base torque computation section 42 constitutes first means for computing the pump base torque, which is the total maximum absorption torque available to the first, second, and third hydraulic pumps 2-4, in accordance with the target rotation speed. The third pump reference absorption torque setup section 43 constitutes second means for presetting the reference absorption torque for the third hydraulic pump 4. The correction torque computation section 45 constitutes third means for computing the difference between the current absorption torque of the third hydraulic pump 4 and the reference absorption torque as the correction torque value in accordance with the delivery pressure of the third hydraulic pump 4. The subtraction section 44 and addition section 46 constitute fourth means for computing the maximum absorption torque available to the first and second hydraulic pumps 2, 3 by using the pump base torque computed by the first means, the reference absorption torque for the third hydraulic pump that is set in the second means, and the correction torque value computed by the third means.

The operation of the present embodiment, which is configured as described above, will now be described.

When a hydraulic actuator related to the first and second hydraulic pumps such as hydraulic actuator 7 is operating, the hydraulic fluid from the first hydraulic pump is supplied to hydraulic actuator 7 through the associated flow control valve, which is included in valve group 6*a* of the control valve unit 6. In this instance, control is exercised so as to increase the delivery pressure of the first hydraulic pump 2 by means of the load pressure of hydraulic actuator 7, direct the delivery pressure of the first hydraulic pump 2 to the pressure reception section 31*c* of the first regulator 31, and decrease the displacement (absorption torque) of the first hydraulic pump 2 when the delivery pressure of the first hydraulic pump 2 exceeds a predefined value. This predefined value varies with the control pressure directed to the pressure reception section 31*e* of the first regulator 31 (i.e., target absorption torque Tn) as described later.

<When a Hydraulic Actuator Related to the Third Hydraulic Pump 4 is Not Operating>

When a hydraulic actuator related to the third hydraulic pump 4 such as hydraulic actuator 12 is not operating, the delivery pressure of the third hydraulic pump 4 is lowered to the tank pressure PO so that the third hydraulic pump 4 consumes an absorption torque of T3min.

The addition section 46 of the controller computes Tr−T3min as the target absorption torque Tn. In accordance with this target absorption torque Tn, the associated drive current is output to the solenoid proportional valve 35 so that the associated control pressure is directed to the pressure reception section 31*e* of the first regulator 31. This control pressure works against the forces of the springs 31*a*, 31*b* of the first regulator 31 so that the maximum absorption torque available to the first and second hydraulic pumps is adjusted to match the target absorption torque Tn (Tr−T3min).

Curve TA in FIG. 2 is a constant torque curve that corresponds to the target absorption torque Tn (Tr−T3min). Polygonal line A in FIG. 2 is a characteristic line of absorption torque control by the first regulator 31 that is set in such an instance.

When characteristic line A is set to represent the absorption torque control by the first regulator 31 as described above, the first regulator 31 controls the displacements of the first and second hydraulic pumps 2, 3 as described below. While the sum of the delivery pressures of the first and second hydraulic pumps 2, 3 is within the range of P0 to P1A, no absorption torque control is provided so that the displacements of the first and second hydraulic pumps 2, 3 stay on the maximum displacement characteristic line L1 and remain maximized (fixed). When the sum of the delivery pressures of the first and second hydraulic pumps 2, 3 exceeds P1A, absorption torque control is provided so that the displacements of the first and second hydraulic pumps 2, 3 decrease along characteristic line A, and that the absorption torques of the first and second hydraulic pumps 2, 3 do not exceed the prescribed torque Ta (=Tn=Tr−T3min) indicated by constant torque curve TA.

As described above, when the delivery pressure of the third hydraulic pump is P0, the absorption torque of the third hydraulic pump is T3min. Further, the maximum absorption torque of the first and second hydraulic pumps is Tr−T3min. Therefore, the total maximum absorption torque of the first, second, and third hydraulic pumps is Tr. It means that the pump base torque Tr is just enough and can be used up.

<When a Hydraulic Actuator Related to the Third Hydraulic Pump 4 is Operating>

When a hydraulic actuator related to the third hydraulic pump 4 operates to raise the delivery pressure of the third hydraulic pump 4, the addition section 46 of the controller computes the target absorption torque Tn according to the third pump delivery pressure.

<Pump Delivery Pressure Between P0 and P1>

While the third pump delivery pressure is within the range of P0 to P1, the third hydraulic pump consumes an absorption torque between T3min and T3r, which is indicated by straight line G in FIG. 6B.

Meanwhile, while the third pump delivery pressure is within the range of P0 to P1, the addition section 46 of the controller computes a value within the range of Tr−T3min to Tf (=Tr−T3r), which decreases with an increase in the third pump delivery pressure as indicated by straight line Gb in FIG. 7, as the target absorption torque Tn. When the third pump delivery pressure reaches P1, the addition section 46 computes Tf as the target absorption torque Tn. In either case, the associated drive current is output to the solenoid proportional valve 35 in accordance with the target absorption torque Tn so that the associated control pressure is directed to the pressure reception section 31*e* of the first regulator 31. Since the output pressure Pc computed by the solenoid valve output pressure computation section 47 is in inverse proportion to the target absorption torque Tn, the control pressure directed to the pressure reception section 31*e* of the first regulator 31 increases when the third pump delivery pressure increases within the range of P0 to P1. This control pressure then works against the forces of the springs 31*a*, 31*b*. In the first regulator 31, the maximum absorption torque set by the pressure reception section 31*e* and springs 31*a*, 31*b* decreases so that the maximum absorption torque available to the first and second hydraulic pumps 2, 3 is adjusted to match the target absorption torque Tn.

Curve TB in FIG. 2 is a constant torque curve that corresponds to the target absorption torque Tn prevailing when the third pump delivery pressure reaches P1 and Tf is computed as the target absorption torque Tn. Polygonal line B in FIG. 2 is a characteristic line of absorption torque control provided by the first regulator 31, which is set accordingly. While the third pump delivery pressure rises from P0 to P1, the characteristic line of absorption torque control shifts from A to B in accordance with an increase in the third pump delivery pressure, and the associated constant torque curve shifts from TA to TB.

If the sum of the delivery pressures of the first and second hydraulic pumps 2, 3 is within the range of P0 to P1B (<P1A) when characteristic line B of absorption torque control is set for the first regulator 31, no absorption torque control is exercised so that the displacements of the first and second hydraulic pumps 2, 3 stay on the maximum displacement characteristic line L1 and remain maximized (fixed). If the sum of the delivery pressures of the first and second hydraulic pumps 2, 3 exceeds P1B (<P1A), absorption torque control is exercised so that the displacements of the first and second hydraulic pumps 2, 3 decrease along characteristic line B, and that the absorption torques of the first and second hydraulic pumps 2, 3 do not exceed a prescribed torque Tb (=Tn=Tf) indicated by constant torque curve TB.

While the characteristic line of absorption torque control by the first regulator 31 shifts from A to B, the start pressure for absorption torque control by the first regulator 31 decreases from P1A to P1B, and the pump delivery pressure range based on absorption torque control by the first regulator 31 changes from a P1A-to-Pmax range to a P1B-to-Pmax range accordingly.

As described above, while the third pump delivery pressure is within the range of P0 to P1 , the maximum absorption torque of the third hydraulic pump ranges from T3min to T3r, and the maximum absorption torque of the first and second hydraulic pumps ranges from Tr−T3min to Tr−T3r. In this case, too, the total absorption torque of the first, second, and third hydraulic pumps is Tr; therefore, the pump base torque Tr is just enough and can be used up.

<Pump Delivery Pressure Between P1 and P2>

While the third pump delivery pressure is within the range of P1 to P2, the third hydraulic pump consumes an absorption torque between T3r and Td, which is indicated by curve H1 in FIG. 6B.

Meanwhile, while the third pump delivery pressure is within the range of P1 to P2, the addition section 46 of the controller computes a value within the range of Tf (=Tr−T3r) to Tr−Td, which decreases with an increase in the third pump delivery pressure as indicated by curve Hb1 in FIG. 7, as the target absorption torque Tn. When the third pump delivery pressure reaches P2, the addition section 46 computes Tr−Td as the target absorption torque Tn. In either case, the associated drive current is output to the solenoid proportional valve 35 in accordance with the target absorption torque Tn so that the associated control pressure is directed to the pressure reception section 31*e* of the first regulator 31. As is the case where the third pump delivery pressure is within the range of P0 to P1, the control pressure directed to the pressure reception section 31*e* of the first regulator 31 increases when the third pump delivery pressure increases within the range of P1 to P2. The maximum absorption torque, which is set by the control pressure and springs 31*a*, 31*b*, then decreases so that the maximum absorption torque available to the first and second hydraulic pumps 2, 3 is adjusted to match the target absorption torque Tn.

Curve TC in FIG. 2 is a constant torque curve that corresponds to the target absorption torque Tn prevailing when the third pump delivery pressure reaches P2 and Tr−Td is computed as the target absorption torque Tn. Polygonal line C in FIG. 2 is a characteristic line of absorption torque control provided by the first regulator 31, which is set accordingly. While the third pump delivery pressure rises from P1 to P2, the characteristic line of absorption torque control shifts from B to C in accordance with an increase in the third pump delivery pressure, and the associated constant torque curve shifts from TB to TC.

If the sum of the delivery pressures of the first and second hydraulic pumps 2, 3 is within the range of P0 to P1C (<P1B) when characteristic line C of absorption torque control is set for the first regulator 31, no absorption torque control is exercised so that the displacements of the first and second hydraulic pumps 2, 3 stay on the maximum displacement characteristic line L1 and remain maximized (fixed). If the sum of the delivery pressures of the first and second hydraulic pumps 2, 3 exceeds P1C (<P1B), absorption torque control is exercised so that the displacements of the first and second hydraulic pumps 2, 3 decrease along characteristic line C, and that the absorption torques of the first and second hydraulic pumps 2, 3 do not exceed a prescribed torque Tc (=Tn=Tr−Td) indicated by constant torque curve TC.

While the characteristic line of absorption torque control by the first regulator 31 shifts from B to C, the start pressure for absorption torque control by the first regulator 31 decreases from P1B to P1C, and the pump delivery pressure range based on absorption torque control by the first regulator 31 changes from a P1B-to-Pmax range to a P1C-to-Pmax range.

As described above, while the third pump delivery pressure is within the range of P1 to P2, the maximum absorption torque of the third hydraulic pump ranges from T3r to Td, and the maximum absorption torque of the first and second hydraulic pumps ranges from Tr−T3r to Tr−Td. In this case, too, the total absorption torque of the first, second, and third hydraulic pumps is Tr; therefore, the pump base torque Tr is just enough and can be used up.

<Pump Delivery Pressure Between P2 and Pmax>

While the third pump delivery pressure is within the range of P2 to Pmax, the third hydraulic pump consumes an absorption torque between Td and T3r, which is indicated by curve H2 in FIG. 6B.

Meanwhile, while the third pump delivery pressure is within the range of P2 to Pmax, the addition section 46 of the controller computes a value within the range of Tr−Td to Tf (=Tr−T3r), which increases with an increase in the third pump delivery pressure as indicated by straight line/curve Hb2 in FIG. 7, as the target absorption torque Tn. When the third pump delivery pressure reaches Pmax, the addition section 46 computes a value close to Tf as the target absorption torque Tn. In either case, the associated drive current is output to the solenoid proportional valve 35 in accordance with the target absorption torque Tn so that the associated control pressure is directed to the pressure reception section 31*e* of the first regulator 31. In this instance, the control pressure directed to the pressure reception section 31*e* of the first regulator 31 decreases when the third pump delivery pressure increases within the range of P2 to Pmax. The maximum absorption torque, which is set by the control pressure and springs 31*a*, 31*b*, then increases so that the maximum absorption torque available to the first and second hydraulic pumps 2, 3 is adjusted to match the target absorption torque Tn. Consequently, while the third pump delivery pressure increases from P2 to Pmax, the characteristic line of absorption torque control shifts so as to return from C to B in accordance with an increase in the third pump delivery pressure, and the associated constant torque curve shifts from TC to TB (see FIG. 2). Further, the start pressure for absorption torque control by the first regulator 31 increases from P1C to P1B in accordance with the above shift in the absorption torque control characteristic line, and the pump delivery pressure range based on absorption torque control by the first regulator 31 changes from a P1C-to-Pmax range to a P1B-to-Pmax range.

As described above, while the third pump delivery pressure is within the range of P2 to Pmax, the absorption torque of the third hydraulic pump ranges near from Td to T3r, and the absorption torques of the first and second hydraulic pumps range near from Tr−Td to Tr−T3r. In this case, too, the total absorption torque of the first, second, and third hydraulic pumps is Tr; therefore, the pump base torque Tr is just enough and can be used up.

As described above, the correction torque computation section 45 according to the present embodiment calculates the correction torque value that represents the difference between the current absorption torque of the third hydraulic pump 4 (consumption torque) and the third pump reference absorption torque T3r. The addition section 46 according to the present embodiment adds the correction torque value Tm to the maximum absorption torque reference value Tf, calculates the target absorption torque Tn that represents the maximum absorption torque available to the first and second hydraulic pumps 2, 3, and shifts the characteristic line of absorption torque control by the first regulator 31 in such a manner as to obtain the target absorption torque Tn. This makes it possible to provide three-pump torque control according to an accurately determined absorption torque of the third hydraulic pump 4 and can use up the pump base torque Tr, which is just enough. Consequently, the pump base torque Tr can be set within the output torque Te of the engine 1 in such a manner as to make the torque Tr close to the output torque Te as much as possible so that the difference between the pump base torque Tr and the output torque Te may be minimized. This results in effective use of the output torque of the engine.

Figure 8:
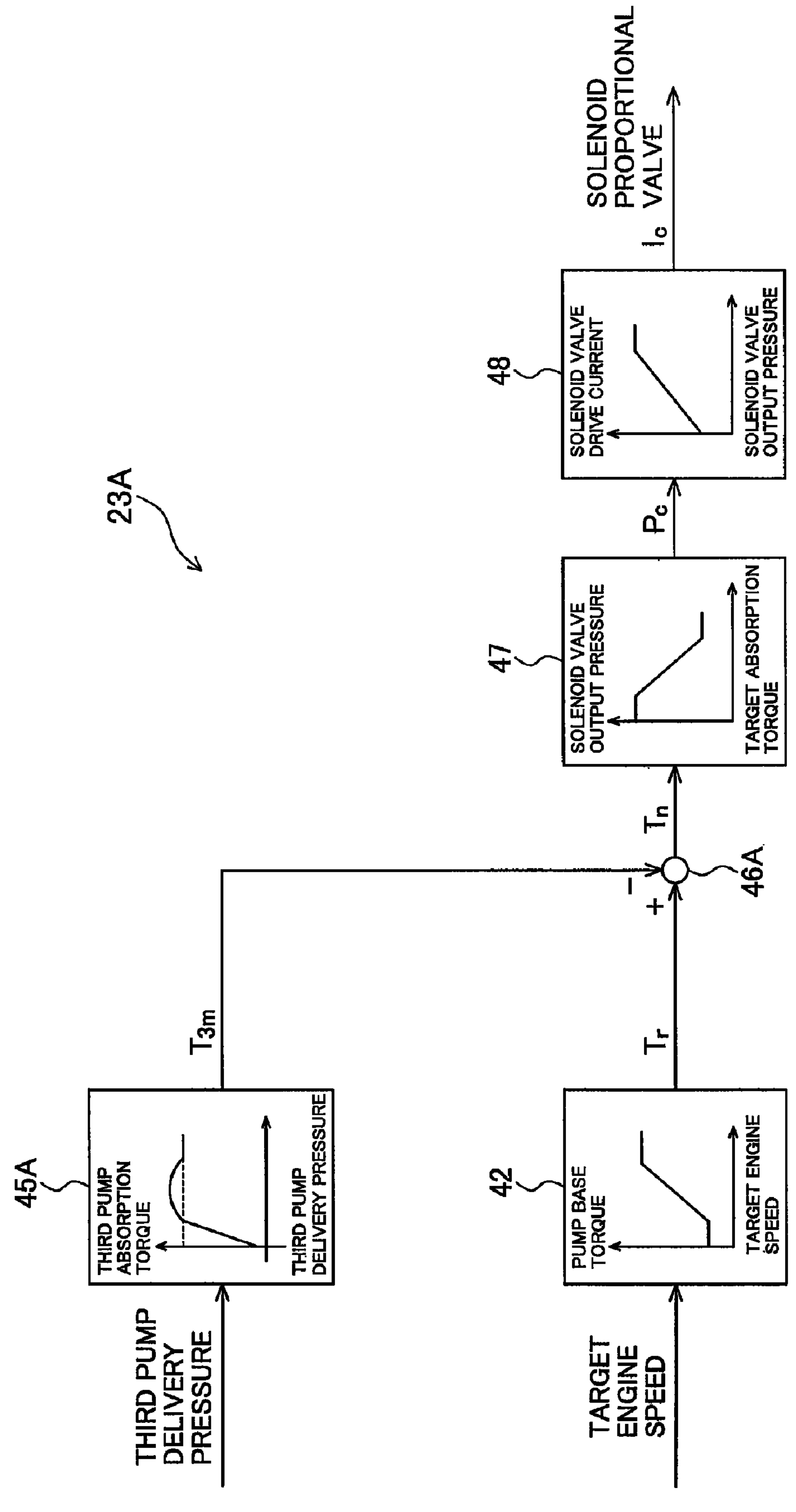
FIG. 8 is a functional block diagram similar to FIG. 4, and illustrates a controller's processing function related to a torque control apparatus according to a second embodiment of the present invention.

A second embodiment of the present invention will now be described with reference to FIG. 8. FIG. 8 is a functional block diagram similar to FIG. 4, and illustrates a controller's processing function related to a torque control apparatus according to the second embodiment of the present invention. Elements shown in FIGS. 4 and 8 are designated by the same reference numerals when they are equivalent. The present embodiment relates to a modified example of a computation algorithm used within the controller according to the first embodiment.

Referring to FIG. 8, the controller 23A according to the present embodiment includes a pump base torque computation section 42, a third pump absorption torque computation section 45A, a subtraction section 46A, a solenoid valve output pressure computation section 47, and a solenoid valve drive current computation section 48.

The third pump absorption torque computation section 45A directly calculates the current absorption torque of the third hydraulic pump 4 (consumption torque) from the delivery pressure of the third hydraulic pump 4. This section 45A inputs a detection signal about the delivery pressure of the third hydraulic pump 4 (third pump delivery pressure) from the pressure sensor 34, causes a table stored in a memory to reference the detection signal, and computes the current absorption torque of the third hydraulic pump 4 (consumption torque) T3m that corresponds to the third pump delivery pressure. The table in the memory predefines the relationship between the third pump delivery pressure and the absorption torque of the third hydraulic pump 4 (consumption torque), which is shown in FIG. 6B.

The subtraction section 46A subtracts the current absorption torque of the third pump, which is computed by the third pump absorption torque computation section 45A, from the pump base torque Tr, which is computed by the pump base torque computation section 42, and calculates the target absorption torque Tn that represents the maximum absorption torque available to the first and second hydraulic pumps 2, 3. This can be expressed as follows:

$$Tn=Tr-T3m$$

As is the case with the first embodiment, the target absorption torque Tn, which is computed as described above, is converted to a drive signal for the solenoid proportional valve 35 by the solenoid valve output pressure computation section 47 and solenoid valve drive current computation section 48. The solenoid proportional valve 35 then outputs a control pressure according to the target absorption torque Tn and directs it to the pressure reception section 31*e* of the first regulator.

As described above, the third pump absorption torque computation section 45A calculates the current absorption torque of the third hydraulic pump 4 (consumption torque) from the delivery pressure of the third hydraulic pump 4. Further, the subtraction section 46A subtracts the current absorption torque of the third pump from the pump base torque Tr and calculates the target absorption torque Tn that represents the maximum absorption torque available to the first and second hydraulic pumps 2, 3. Therefore, the present embodiment configured as described above can also provide three-pump torque control according to an accurately determined absorption torque of the third hydraulic pump 4, accurately control the total absorption torque of the first, second, and third hydraulic pumps, and effectively use the output torque of the engine.

Figure 9:
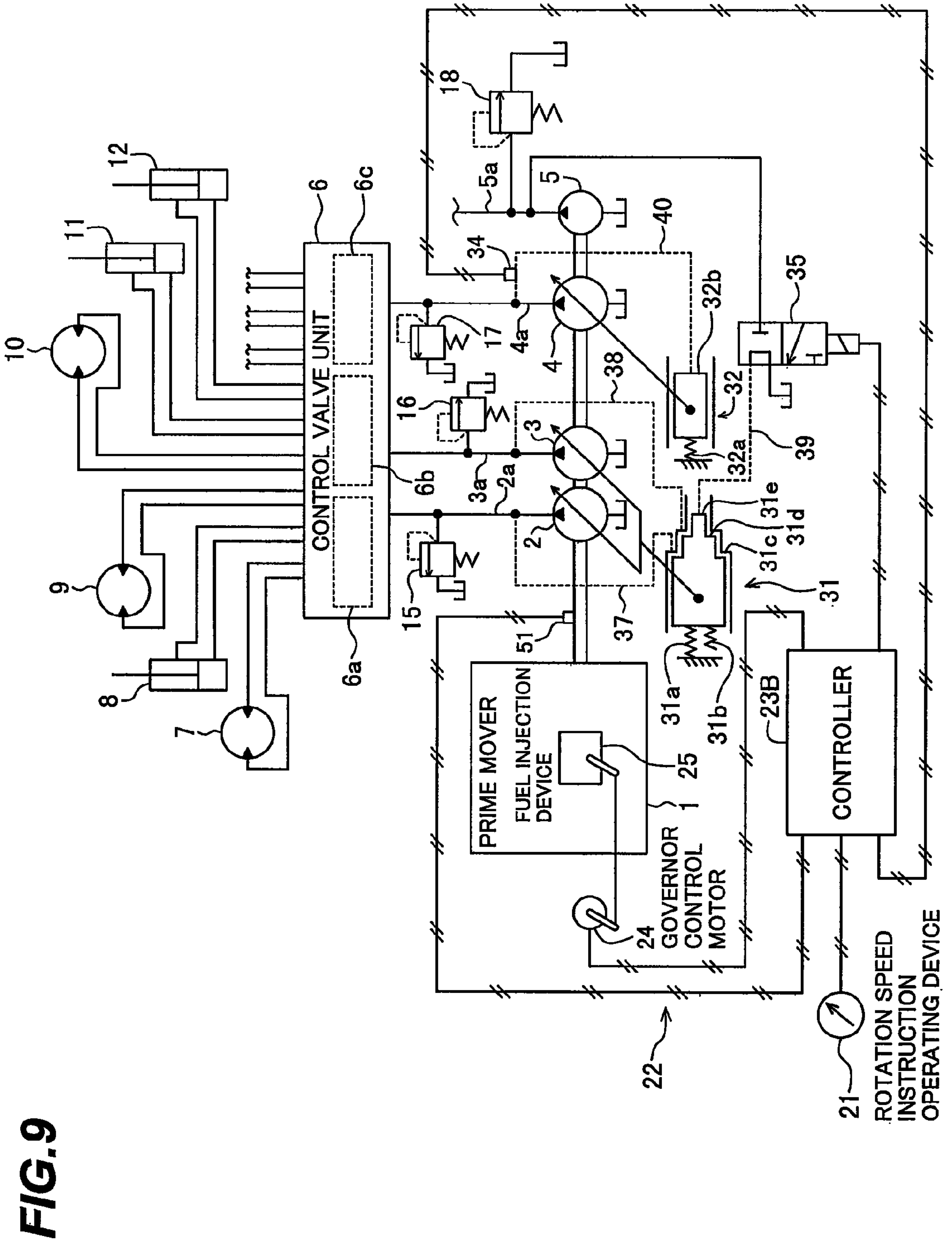
FIG. 9 is a diagram illustrating the overall configuration of a construction machine three-pump system having a torque control apparatus according to a third embodiment of the present invention.
Figure 10:
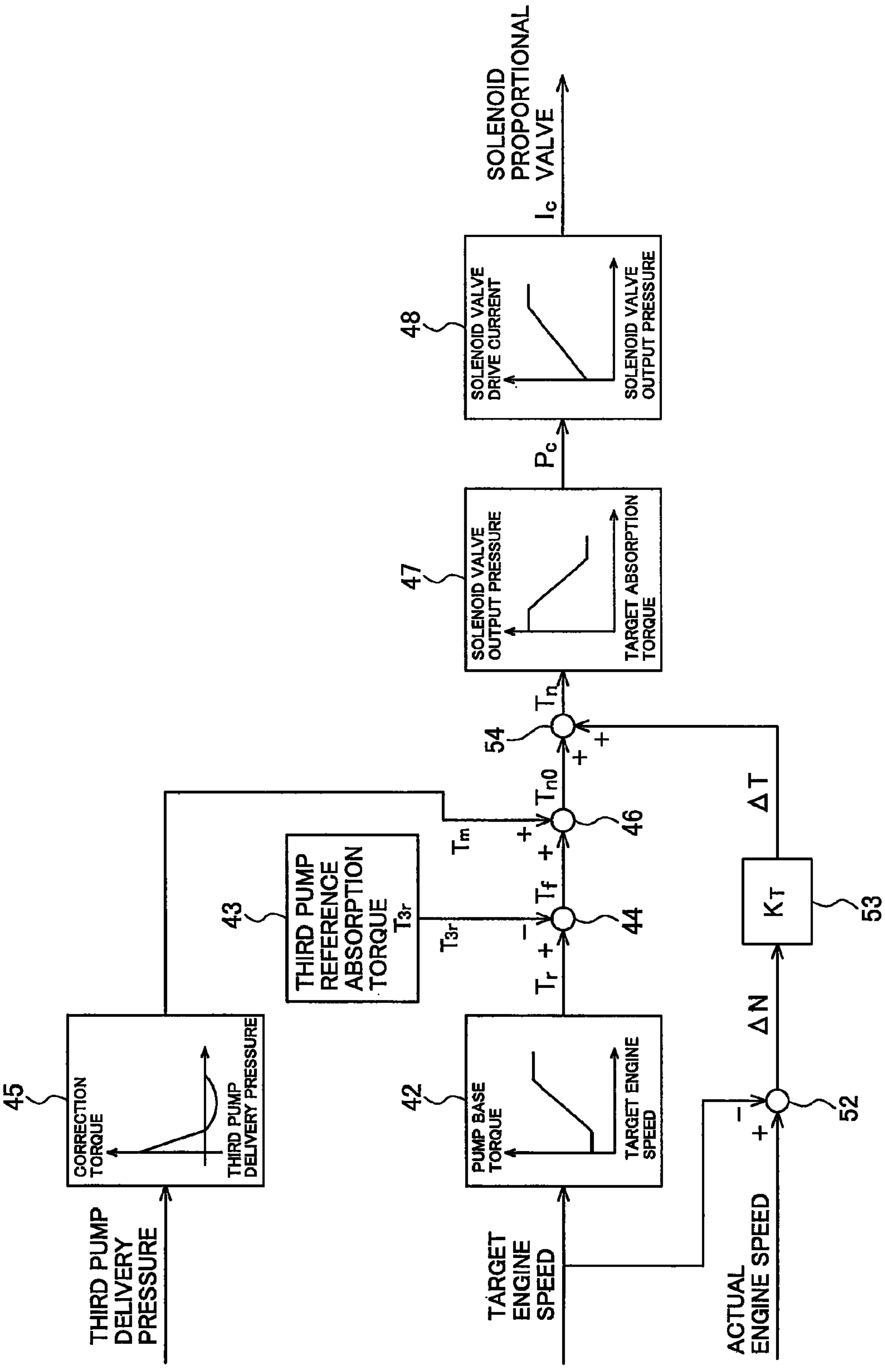
FIG. 10 is a functional block diagram illustrating a controller's processing function related to the torque control apparatus according to the third embodiment of the present invention.

A third embodiment of the present invention will now be described with reference to FIGS. 9 to 11. FIG. 9 is a diagram illustrating the overall configuration of a construction machine three-pump system having a torque control apparatus according to the third embodiment of the present invention. FIG. 10 is a functional block diagram illustrating a controller's processing function related to the torque control apparatus. Elements shown in FIGS. 1, 4, 9, and 10 are designated by the same reference numerals when they are equivalent. The present embodiment uses the torque control function of the first embodiment and adds a speed sensing control function to the torque control function.

Referring to FIG. 9, the torque control apparatus according to the present embodiment includes a rotation speed sensor 51, which detects the rotation speed of the engine 1, in addition to a controller 23B, a first regulator 31, a second regulator 32, a pressure sensor 34, and a solenoid proportional valve 35.

Referring to FIG. 10, the controller 23B according to the present embodiment includes a subtraction section 52, a gain multiplication section 53, and an addition section 54 in addition to the elements shown in FIG. 4 (pump base torque computation section 42, third pump reference absorption torque setup section 43, subtraction section 44, correction torque computation section 45, addition section 46, solenoid valve output pressure computation section 47, and solenoid valve drive current computation section 48).

The subtraction section 52 computes a rotation speed deviation ΔN by subtracting the target rotation speed from the actual rotation speed of the engine 1, which is detected by the rotation speed sensor 51.

The gain multiplication section 53 computes a torque correction value ΔT for speed sensing control by multiplying the rotation speed deviation ΔN, which is computed by the subtraction section 52, by a correction torque gain for speed sensing control (speed sensing control gain) KT.

The addition section 46 adds the correction torque value Tm, which is computed by the correction torque computation section 45, to the reference value Tf for maximum absorption torque, which is determined by the subtraction section 44, to calculate a first target absorption torque Tn0, which represents the maximum absorption torque available to the first and second hydraulic pumps 2, 3. This can be expressed as follows:

$$Tn0=Tf+Tm$$

The addition section 54 computes a second target absorption torque Tn by adding the torque correction value ΔT for speed sensing control, which is computed by the gain multiplication section 53, to the first target absorption torque Tn0, which is computed by the addition section 46.

As is the case with the first embodiment, the second target absorption torque Tn, which is computed as described above, is converted to a drive signal for the solenoid proportional valve 35 by the solenoid valve output pressure computation section 47 and solenoid valve drive current computation section 48. The solenoid proportional valve 35 then outputs a control pressure according to the target absorption torque Tn and directs it to the pressure reception section 31*e* of the first regulator. The first regulator 31 sets the maximum absorption torque to Tn, and exercises control so that the absorption torques of the first and second hydraulic pumps do not exceed Tn.

The controller 23B and solenoid proportional valve 35 constitute control means that computes the deviation between the target rotation speed prescribed by the instruction means (rotation speed instruction operating device) 21 and the actual rotation speed of the engine (prime mover) 1, which is detected by the rotation speed sensor 51, computes the maximum absorption torque available to the first and second hydraulic pumps 2, 3 in accordance with the computed rotation speed deviation, the target rotation speed prescribed by the instruction means 21, and the delivery pressure of the third hydraulic pump 4, which is detected by the pressure sensor 34, and outputs a control signal according to the computation result. The first regulator 31 complies with the control signal and controls the displacements of the first and second hydraulic pumps 2, 3 so that the absorption torques of the first and second hydraulic pumps 2, 3 do not exceed the maximum absorption torque computed by the control means 23B, 35.

Effects of torque decrease control and torque increase control, which are produced by speed sensing control, will now be described with reference to FIG. 11.

Figure 11:
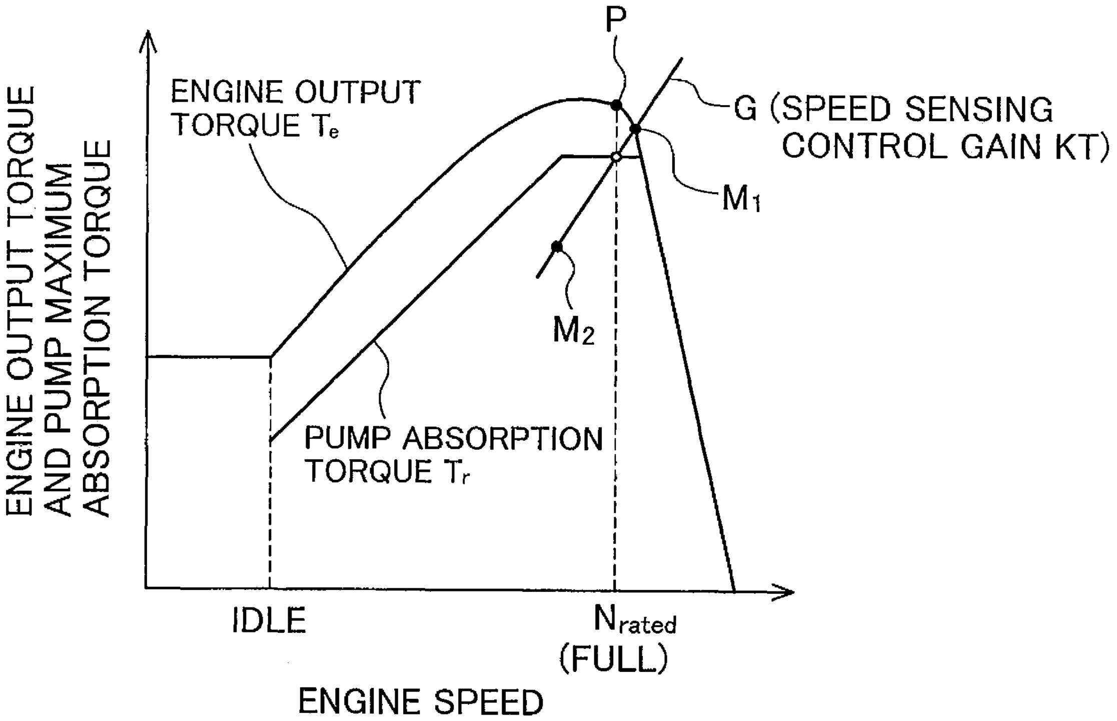
FIG. 11 shows the relationship between engine output torque, pump absorption torque, and speed sensing control.

FIG. 11 shows the relationship between engine output torque, pump absorption torque, and speed sensing control. Straight line DR in FIG. 11 is a characteristic line of a regulation region where the fuel injection device 25 controls the fuel injection amount when a target engine speed is equal to a rated rotation speed Nrated. Point P in the figure is a maximum fuel injection point of the regulation region. In the example shown in the figure, the fuel injection device 25 has a droop characteristic so that control is exercised to increase the engine speed when the engine load decreases from the maximum fuel injection point P. Straight line G is a characteristic line of the speed sensing control gain KT for the gain multiplication section 53 shown in FIG. 10.

<Torque Decrease Control>

If, in a situation where the engine 1 and the first to third hydraulic pumps 2-4 are operating in a state in which the output torque of the engine 1 balances with the absorption torques of the first to third hydraulic pumps 2-4 at point M1 in FIG. 11, the load (delivery pressure) on the first and second hydraulic pumps 2, 3 or the third hydraulic pump 4 suddenly increases, the rotation speed of the engine 1 transiently decreases due to a control response lag in the fuel injection device 25. In this instance, the subtraction section 52 shown in FIG. 10 computes the rotation speed deviation ΔN as a negative value. Further, the gain multiplication section 53 computes the torque correction value ΔT for speed sensing control as a negative value. Furthermore, the addition section 54 adds a negative torque correction value ΔT to the first target absorption torque Tn0 to compute the second target absorption torque Tn that is smaller than the first target absorption torque Tn0 by the absolute value of the torque correction value ΔT. This decreases the maximum absorption torque setting in the first regulator 31 by ΔT and also decreases the absorption torques of the first and second hydraulic pumps, which are controlled by the first regulator 31, in the same manner (torque decrease control). In other words, an absorption torque control operating point for the first to third hydraulic pumps 2-4 moves from a point M1 of balance between the output torque of the engine 1 and the absorption torques of the first to third hydraulic pumps 2-4 to point M2 along the characteristic line G of the speed sensing control gain KT (see FIG. 11). As the absorption torques of the first to third hydraulic pumps 2-4 decrease as described above, the rotation speed of the engine 1 promptly increases to prevent engine performance deterioration and provide improved work performance.

<Torque Increase Control>

At point M1 in FIG. 11 at which the output torque of the engine 1 balances with the absorption torques of the first to third hydraulic pumps 2-4, the subtraction section 52 shown in FIG. 10 computes the rotation speed deviation ΔN as a positive value; the gain multiplication section 53 computes the torque correction value ΔT for speed sensing control as a positive value; and the second target absorption torque Tn computed by the addition section 54 is greater than the first target absorption torque Tn0 by the absolute value of the torque correction value ΔT. As a result, the maximum absorption torque setting in the first regulator 31 increases by ΔT, and the absorption torques of the first and second hydraulic pumps, which are controlled by the first regulator 31, increase accordingly (torque increase control). Consequently, even when the setting for the base pump torque Tr is more than adequate in relation to the engine output torque Te, control can be exercised at a point M1 of balance in a steady state so that the maximum absorption torque of the first regulator 31 (the absorption torques of the first and second hydraulic pumps) is higher than the base pump torque Tr. This makes it possible to effectively use the engine output. Further, enhanced fuel efficiency can be achieved because the operating point of the engine 1 approaches the maximum fuel injection point P.

Even though the present embodiment is configured as described above, the processing function for absorption torque control related to the first, second, and third hydraulic pumps, which is incorporated in the controller 23B (pump base torque computation section 42, third pump reference absorption torque setup section 43, subtraction section 44, correction torque computation section 45, addition section 46, solenoid valve output pressure computation section 47, and solenoid valve drive current computation section 48) makes it possible to exercise three-pump torque control according to an accurately determined absorption torque of the third hydraulic pump 4, accurately control the total absorption torque of the first, second, and third hydraulic pumps 2-4, and effectively use the output torque of the engine, as is the case with the first embodiment.

Further, the present embodiment additionally incorporates the rotation speed sensor 51 and provides the controller 23B with the computation functions of the subtraction section 52, gain multiplication section 53, and addition section 54. Therefore, speed sensing control can be exercised in relation to three-pump torque control. Consequently, while the prime mover is overloaded, torque decrease control can be exercised to prevent engine performance deterioration and provide improved work performance. In addition, while the rotation speed deviation ΔN is positive, torque increase control can be exercised to effectively use the engine output and achieve enhanced fuel efficiency.

Furthermore, the present embodiment uses a single control means (controller 23B) to perform computations for three-pump torque control and speed sensing control so that one control signal provides both of these types of control. Therefore, only one set of equipment, such as the pressure reception section 31*e* of the first regulator 31, is required to receive the control pressure from the solenoid proportional valve 35. This makes it possible to exercise speed sensing control with a simple configuration during three-pump torque control.

The third embodiment uses the processing function (pump base torque computation section 42, third pump reference absorption torque setup section 43, subtraction section 44, correction torque computation section 45, addition section 46, solenoid valve output pressure computation section 47, and solenoid valve drive current computation section 48) according to the first embodiment as the processing function for three-pump torque control in the controller 23B. Alternatively, however, the processing function for speed sensing control may be added to the processing function (pump base torque computation section 42, third pump absorption torque computation section 45A, subtraction section 46A, solenoid valve output pressure computation section 47, and solenoid valve drive current computation section 48) according to the second embodiment. The use of the above alternative also makes it possible to obtain the same advantages as provided by the third embodiment.

Figure 12:
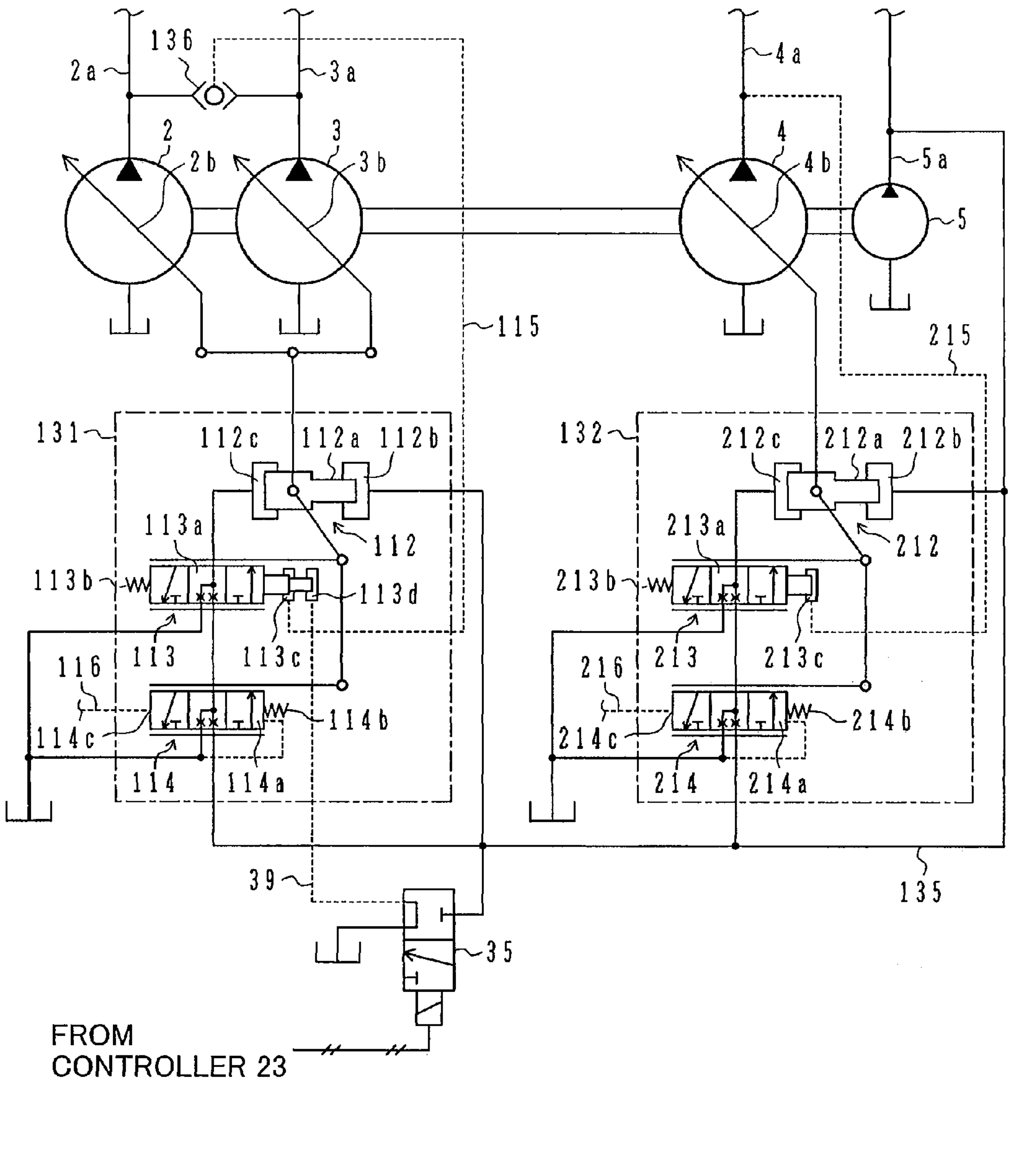
FIG. 12 illustrates a regulator section of a torque control apparatus according to a fourth embodiment of the present invention.

A fourth embodiment of the present invention will now be described with reference to FIG. 12. FIG. 12 illustrates a regulator section of a torque control apparatus according to the fourth embodiment of the present invention. Members shown in FIGS. 1 and 12 are designated by the same reference numerals when they are equivalent. The present embodiment provides first and second regulators with a function for controlling the displacements (delivery flow rates) of the first to third hydraulic pumps in accordance with demanded flow rates.

Referring to FIG. 12, the first and second hydraulic pumps 2, 3 include a first regulator 131, whereas the third hydraulic pump 4 includes a second regulator 132. The first and second hydraulic pumps 2, 3 adjust the displacement volume (capacity) by causing the first regulator 131 to adjust the tilting angles of swash plates 2*b*, 3*b*, which are displacement volume adjustment members, control the pump delivery flow rate in accordance with a demanded flow rate, and adjust the pump absorption torque. The third hydraulic pump 4 adjusts the displacement volume (capacity) by causing the second regulator 131 to adjust the tilting angle of a swash plate 4*b*, which is a displacement volume adjustment member, controls the pump delivery flow rate in accordance with a demanded flow rate, and adjusts the pump absorption torque.

The first regulator 131 includes a tilt control actuator 112, which operates the swash plates 2*b*, 3*b*, and a torque control servo valve 113 and a position control valve 114, which control the tilt control actuator 112. The tilt control actuator 112 includes a pump tilt control spool 112*a*, which is linked to the swash plates 2*b*, 3*b* and has pressure reception sections having different pressure reception areas at both ends; a tilt control torque increase pressure reception chamber 112*b*, which is positioned toward a small-area pressure reception section of the pump tilt control spool 112*a*; and a tilt control torque decrease pressure reception chamber 112*c*, which is positioned toward a large-area pressure reception section of the pump tilt control spool 112*a*. The tilt control torque increase pressure reception chamber 112*b* is connected to the delivery line 5*a* of the pilot pump 5 through a hydraulic line 135. The tilt control torque decrease pressure reception chamber 112*c* is connected to the delivery line 5*a* of the pilot pump 5 through the hydraulic line 135, torque control servo valve 113, and position control valve 114.

The torque control servo valve 113 includes a torque control spool 113*a*; a spring 113*b* positioned toward one end of the torque control spool 113*a*; and a PQ control pressure reception chamber 113*c* and a torque decrease control pressure reception chamber 113*d*, which are positioned toward the other end of the torque control spool 113*a*. The delivery lines 2*a*, 2*b* of the first and second hydraulic pumps 2, 3 are provided with a shuttle valve 136, which detects the delivery pressure prevailing at the high-pressure end of the first and second hydraulic pumps 2, 3. The PQ control pressure reception chamber 113*c* is connected to the output port of the shuttle valve 136 through a signal line 115. The torque decrease control pressure reception chamber 113*d* is connected to the output port of the solenoid proportional valve 35 through the control hydraulic line 39. As described earlier, the solenoid proportional valve 35 operates in accordance with a drive signal (electrical signal) from the controller 23 (FIG. 1).

The position control valve 114 includes a position control spool 114*a*, a weak spring 114*b* that is positioned toward one end of the position control spool 114*a* for position retention purposes, and a control pressure reception chamber 114*c* that is positioned toward the other end of the position control spool 114*a*. A hydraulic signal 116 according to the operation amount (demanded flow rate) of an operation system related to the first and second hydraulic pumps 2, 3 is directed to the control pressure reception chamber 114*c*. The hydraulic signal 116 can be generated by various known methods. For example, the highest operating pilot pressure generated by a control lever may be selected and used as the hydraulic signal 116. If the employed flow rate control valve is of a center bypass type, an alternative would be to install a restrictor downstream of a center bypass line, obtain the pressure prevailing upstream of the restrictor as a negative control pressure, reverse the negative control pressure, and use the resulting pressure as the hydraulic signal 116.

The pump tilt control spool 112*a* controls the swash plate tilting angles (displacements) of the first and second hydraulic pumps 2, 3 in accordance with the pressure balance between the hydraulic fluids in the pressure reception chambers 112*b*, 112*c*. The delivery pressure prevailing at the high-pressure end of the first and second hydraulic pumps 2, 3 is directed to the PQ control pressure reception chamber 113*c* of the torque control servo valve 113. When this delivery pressure rises, the torque control spool 113*a* moves to the left in the figure. This causes the hydraulic fluid discharged from the pilot pump 5 to flow into the pressure reception chamber 112*c*, moves the pump tilt control spool 112*a* to the right in the figure, drives the swash plates 2*b*, 3*b* of the first and second hydraulic pumps 2, 3 in the direction of decreasing the pump displacement volume, and decreases the pump displacement to reduce the pump absorption torque. When the delivery pressures of the first and second hydraulic pumps 2, 3 decrease, the above operation is reversed so that the swash plates 2*b*, 3*b* of the first and second hydraulic pumps 2, 3 are driven in the direction of increasing the pump displacement volume to enlarge the pump displacement volume and increase the pump absorption torque.

The absorption torque control characteristic of the torque control servo valve 113 relative to the first and second hydraulic pumps 2, 3 is determined by the spring 113*b* and the control pressure directed to the torque decrease control pressure reception chamber 113*d*. When the solenoid proportional valve 35 is controlled to vary the control pressure, the absorption torque control characteristic shifts as described earlier (see FIG. 2).

The second regulator 131 includes a tilt control actuator 212, which operates the swash plate 4*b*; and a torque control servo valve 213 and a position control valve 214, which control the tilt control actuator 212. The tilt control actuator 212, torque control servo valve 213, and position control valve 214 are configured the same as the tilt control actuator 112, torque control servo valve 113, and position control valve 114 for the first regulator 131. For elements of the second regulator that are shown in the figure and equivalent to those of the first regulator, the reference numerals are obtained by replacing a three-digit number beginning with 1 by a three-digit number beginning with 2. However, since the torque control servo valve 113 requires no torque setting adjustment, the second regulator does not have an element equivalent to the torque decrease control pressure reception chamber 113*d*.

The operation of the second regulator 131 is substantially the same as that of the first regulator 131. However, the absorption torque control characteristic of the second regulator 132 is constant as it is determined by the spring 213*b* of the torque control servo valve 213 (see FIG. 3).

The present embodiment, which is configured as described above, provides the first regulator 131 and second regulator 132 with a function for controlling the displacements (delivery flow rates) of the first to third hydraulic pumps 2-4 in accordance with a demanded flow rate, and provides the same advantages as the first embodiment.

The invention claimed is:

1. A torque control apparatus for a construction machine three-pump system having a prime mover; a first variable displacement hydraulic pump and a second variable displacement hydraulic pump that are driven by the prime mover; a third variable displacement hydraulic pump that is driven by the prime mover; instruction means for prescribing a target rotation speed of the prime mover; a prime mover control device for controlling the rotation speed of the prime mover in accordance with the target rotation speed prescribed by the instruction means; a first regulator which controls absorption torques of the first and second hydraulic pumps by controlling the displacements of the first and second hydraulic pumps in accordance with the delivery pressures of the first and second hydraulic pumps; and a second regulator which controls an absorption torque of the third hydraulic pump by controlling the displacement of the third hydraulic pump in accordance with the delivery pressure of the third hydraulic pump, the torque control apparatus comprising:

a pressure sensor for detecting the delivery pressure of the third hydraulic pump; and control means for computing a maximum absorption torque (Tn) available to the first and second hydraulic pumps that is obtained by subtracting a calculated absorption torque of the third hydraulic pump from a pump base torque (Tr), which is a total absorption torque available to the first, second, and third hydraulic pumps, in accordance with the target rotation speed prescribed by the instruction means and the delivery pressure of the third hydraulic pump that is detected by the pressure sensor, and outputting a control signal according to the computation result;

wherein the first regulator controls the displacements of the first and second hydraulic pumps in accordance with the control signal to ensure that the absorption torques of the first and second hydraulic pumps do not exceed the maximum absorption torque (Tn) computed by the control means.

2. The torque control apparatus for the construction machine three-pump system according to claim 1, wherein the control means includes first means for computing the pump base torque (Tr), in accordance with the target rotation speed; second means in which a reference absorption torque (T3r) for the third hydraulic pump is preset; third means for computing the difference between the calculated absorption torque of the third hydraulic pump and the reference absorption torque as a correction torque value (Tm) in accordance with the delivery pressure of the third hydraulic pump; and fourth means for computing the maximum absorption torque (Tn) by using the pump base torque computed by the first means, the reference absorption torque for the third hydraulic pump that is preset in the second means, and the correction torque value computed by the third means.

3. The torque control apparatus for the construction machine three-pump system according to claim 2, wherein the second means sets, as the reference absorption torque (T3r) for the third hydraulic pump, an absorption torque of the third hydraulic pump prevailing at the minimum delivery pressure (P1) within the delivery pressure range of the third hydraulic pump over which absorption torque control is provided by the second regulator.

4. The torque control apparatus for the construction machine three-pump system according to claim 2, wherein the fourth means computes the reference value (Tf) for the maximum absorption torque available to the first and second hydraulic pumps by subtracting the reference absorption torque (T3r) for the third hydraulic pump, which is set in the second means, from the pump base torque (Tr) computed by the first means, and computes the maximum absorption torque (Tn) by adding the correction torque value (Tm) computed by the third means to the reference value for the maximum absorption torque.

5. The torque control apparatus for the construction machine three-pump system according to claim 1, wherein the control means includes first means for computing the pump base torque (Tr), in accordance with the target rotation speed; second means for computing the calculated absorption torque of the third hydraulic pump in accordance with the delivery pressure of the third hydraulic pump; and third means for computing the maximum absorption torque (Tn) by subtracting the calculated absorption torque of the third hydraulic pump, which is computed by the second means, from the pump base torque computed by the first means.

6. A torque control apparatus for a construction machine three-pump system having a prime mover; a first variable displacement hydraulic pump and a second variable displacement hydraulic pump that are driven by the prime mover; a third variable displacement hydraulic pump that is driven by the prime mover; instruction means for prescribing a target rotation speed of the prime mover; a prime mover control device for controlling the rotation speed of the prime mover in accordance with the target rotation speed prescribed by the instruction means; a first regulator which controls absorption torques of the first and second hydraulic pumps by controlling the displacements of the first and second hydraulic pumps in accordance with the delivery pressures of the first and second hydraulic pumps; and a second regulator which controls an absorption torque of the third hydraulic pump by controlling the displacement of the third hydraulic pump in accordance with the delivery pressure of the third hydraulic pump, the torque control apparatus comprising:

a pressure sensor for detecting the delivery pressure of the third hydraulic pump;

a rotation speed sensor for detecting the actual rotation speed of the prime mover; and control means for computing the deviation between the target rotation speed prescribed by the instruction means and the actual rotation speed of the prime mover that is detected by the rotation speed sensor, computing a maximum absorption torque (Tn) available to the first and second hydraulic pumps that is obtained by subtracting a calculated absorption torque of the third hydraulic pump from a pump base torque (Tr), which is a total absorption torque available to the first, second, and third hydraulic pumps, in accordance with the rotation speed deviation (ΔN), the target rotation speed prescribed by the instruction means, and the delivery pressure of the third hydraulic pump that is detected by the pressure sensor, and outputting a control signal according to the computation results;

wherein the first regulator controls the displacements of the first and second hydraulic pumps in accordance with the control signal to ensure that the absorption torques of the first and second hydraulic pumps do not exceed the maximum absorption torque (Tn) computed by the control means.

7. The torque control apparatus for the construction machine three-pump system according to claim 6, wherein the control means includes fifth means for computing a first target value of the maximum absorption torque available to the first and second hydraulic pumps in accordance with the target rotation speed prescribed by the instruction means and the delivery pressure of the third hydraulic pump that is detected by the pressure sensor; sixth means for computing a torque correction value (ΔT) in accordance with the rotation speed deviation (ΔN); and seventh means for computing a second target value of the maximum absorption torque available to the first and second hydraulic pumps by adding the torque correction value (ΔT) to the first target value.

8. The torque control apparatus for the construction machine three-pump system according to claim 7, wherein the fifth means includes first means for computing the pump base torque (Tr) in accordance with the target rotation speed; second means in which the reference absorption torque (T3r) for the third hydraulic pump is preset; third means for computing the difference between the calculated absorption torque of the third hydraulic pump and the reference absorption torque as the correction torque value (Tm) in accordance with the delivery pressure of the third hydraulic pump; and fourth means for computing the first target value of the maximum absorption torque available to the first and second hydraulic pumps by using the pump base torque computed by the first means, the reference absorption torque for the third hydraulic pump that is set in the second means, and the correction torque value computed by the third means.

9. The torque control apparatus for the construction machine three-pump system according to claim 7, wherein the fifth means includes first means for computing the pump base torque (Tr), in accordance with the target rotation speed; second means for computing the calculated absorption torque (T3m) of the third hydraulic pump in accordance with the delivery pressure of the third hydraulic pump; and third means for computing the first target value of the maximum absorption torque available to the first and second hydraulic pumps by subtracting the calculated absorption torque of the third hydraulic pump, which is computed by the second means, from the pump base torque computed by the first means.

10. A torque control apparatus for a construction machine three-pump system having a prime mover; a first variable displacement hydraulic pump and a second variable displacement hydraulic pump that are driven by the prime mover; a third variable displacement hydraulic pump that is driven by the prime mover; instruction means for prescribing a target rotation speed of the prime mover; a prime mover control device for controlling the rotation speed of the prime mover in accordance with the target rotation speed prescribed by the instruction means; a first regulator which controls the absorption torques of the first and second hydraulic pumps by controlling the displacements of the first and second hydraulic pumps in accordance with the delivery pressures of the first and second hydraulic pumps; and a second regulator which controls an absorption torque of the third hydraulic pump by controlling the displacement of the third hydraulic pump in accordance with the delivery pressure of the third hydraulic pump, the torque control apparatus comprising:

a pressure sensor for detecting the delivery pressure of the third hydraulic pump;

a rotation speed sensor for detecting the actual rotation speed of the prime mover; and control means for computing the deviation between the target rotation speed prescribed by the instruction means and the actual rotation speed of the prime mover that is detected by the rotation speed sensor, computing a maximum absorption torque (Tn) available to the first and second hydraulic pumps in accordance with the rotation speed deviation (ΔN), the target rotation speed prescribed by the instruction means, and the delivery pressure of the third hydraulic pump that is detected by the pressure sensor, and outputting a control signal according to the computation results;

wherein the first regulator controls the displacements of the first and second hydraulic pumps in accordance with the control signal to ensure that the absorption torques of the first and second hydraulic pumps do not exceed the maximum absorption torque (Tn) computed by the control means.

11. The torque control apparatus for the construction machine three-pump system according to claim 10, wherein the control means includes first means for computing a pump base torque (Tr), which is a total absorption torque available to the first, second, and third hydraulic pumps, in accordance with the target rotation speed; second means in which a reference absorption torque (T3r) for the third hydraulic pump is preset; third means for computing a difference between an absorption torque of the third hydraulic pump and the reference absorption torque as a correction torque value (Tm) in accordance with the delivery pressure of the third hydraulic pump; and fourth means for computing the maximum absorption torque (Tn) by using the pump base torque computed by the first means, the reference absorption torque for the third hydraulic pump that is preset in the second means, and the correction torque value computed by the third means.

12. The torque control apparatus for the construction machine three-pump system according to claim 11, wherein the second means sets, as the reference absorption torque (T3r) for the third hydraulic pump, the absorption torque of the third hydraulic pump prevailing at the minimum delivery pressure (P1) within the delivery pressure range of the third hydraulic pump over which absorption torque control is provided by the second regulator.

13. The torque control apparatus for the construction machine three-pump system according to claim 11, wherein the fourth means computes a reference value (Tf) for the maximum absorption torque available to the first and second hydraulic pumps by subtracting the reference absorption torque (T3r) for the third hydraulic pump, which is set in the second means, from the pump base torque (Tr) computed by the first means, and computes the maximum absorption torque (Tn) by adding the correction torque value (Tm) computed by the third means to the reference value (Tf) for the maximum absorption torque.

14. The torque control apparatus for the construction machine three-pump system according to claim 10, wherein the control means includes first means for computing the pump base torque (Tr) in accordance with the target rotation speed; second means for computing the absorption torque (T3m) of the third hydraulic pump in accordance with the delivery pressure of the third hydraulic pump; and third means for computing the maximum absorption torque (Tn) by subtracting the absorption torque of the third hydraulic pump, which is computed by the second means, from the pump base torque computed by the first means.

15. The torque control apparatus for the construction machine three-pump system according to claim 10, wherein the control means includes fifth means for computing a first target value of the maximum absorption torque in accordance with the target rotation speed prescribed by the instruction means and the delivery pressure of the third hydraulic pump that is detected by the pressure sensor; sixth means for computing a torque correction value (ΔT) in accordance with the rotation speed deviation (ΔN); and seventh means for computing a second target value of the maximum absorption torque by adding the torque correction value (ΔT) to the first target value of the maximum absorption torque computed by the fifth means.

16. The torque control apparatus for the construction machine three-pump system according to claim 15, wherein the fifth means includes first means for computing the pump base torque (Tr), in accordance with the target rotation speed; second means in which the reference absorption torque (T3r) for the third hydraulic pump is preset; third means for computing a difference between the absorption torque of the third hydraulic pump and the reference absorption torque as the correction torque value (Tm) in accordance with the delivery pressure of the third hydraulic pump; and fourth means for computing the first target value of the maximum absorption torque available to the first and second hydraulic pumps by using the pump base torque computed by the first means, the reference absorption torque for the third hydraulic pump that is set in the second means, and the correction torque value computed by the third means.

17. The torque control apparatus for the construction machine three-pump system according to claim 15, wherein the fifth means includes first means for computing the pump base torque (Tr), in accordance with the target rotation speed; second means for computing the absorption torque (T3m) of the third hydraulic pump in accordance with the delivery pressure of the third hydraulic pump; and third means for computing the first target value of the maximum absorption torque by subtracting the absorption torque of the third hydraulic pump, which is computed by the second means, from the pump base torque computed by the first means.

18. A torque control apparatus for a construction machine three-pump system having a prime mover; a first variable displacement hydraulic pump and a second variable displacement hydraulic pump that are driven by the prime mover; a third variable displacement hydraulic pump that is driven by the prime mover; instruction means for prescribing a target rotation speed of the prime mover; a prime mover control device for controlling the rotation speed of the prime mover in accordance with the target rotation speed prescribed by the instruction means; a first regulator which controls the absorption torques of the first and second hydraulic pumps by controlling the displacements of the first and second hydraulic pumps in accordance with the delivery pressures of the first and second hydraulic pumps; and a second regulator which controls the absorption torque of the third hydraulic pump by controlling the displacement of the third hydraulic pump in accordance with the delivery pressure of the third hydraulic pump, the torque control apparatus comprising:

a pressure sensor for detecting the delivery pressure of the third hydraulic pump; and control means for computing a maximum absorption torque (Tn) available to the first and second hydraulic pumps in accordance with the target rotation speed prescribed by the instruction means and the delivery pressure of the third hydraulic pump that is detected by the pressure sensor, and outputting a control signal according to the computation result;

wherein the first regulator controls the displacements of the first and second hydraulic pumps in accordance with the control signal to ensure that the absorption torques of the first and second hydraulic pumps do not exceed the maximum absorption torque (Tn) computed by the control means, and wherein the control means includes first means for computing a pump base torque (Tr), which is a total maximum absorption torque available to the first, second, and third hydraulic pumps, in accordance with the target rotation speed; second means in which a reference absorption torque (T3r) for the third hydraulic pump is preset; third means for computing the difference between the absorption torque of the third hydraulic pump and the reference absorption torque as a correction torque value (Tm) in accordance with the delivery pressure of the third hydraulic pump; and fourth means for computing the maximum absorption torque (Tn) by using the pump base torque computed by the first means, the reference absorption torque for the third hydraulic pump that is preset in the second means, and the correction torque value computed by the third means.

19. The torque control apparatus for the construction machine three-pump system according to claim 18, wherein the second means sets, as the reference absorption torque (T3r) for the third hydraulic pump, the absorption torque of the third hydraulic pump prevailing at the minimum delivery pressure (P1) within the delivery pressure range of the third hydraulic pump over which absorption torque control is provided by the second regulator.

* * * * *